(12) United States Patent
Wang et al.

(10) Patent No.: US 11,695,693 B2
(45) Date of Patent: Jul. 4, 2023

(54) PACKET TRANSMISSION METHOD, DEVICE, AND SYSTEM

(71) Applicant: HUAWEI TECHNOLOGIES CO., LTD., Guangdong (CN)

(72) Inventors: Haibo Wang, Beijing (CN); Xun Hu, Nanjing (CN); Rongrong Hua, Nanjing (CN); Tong Zhu, Nanjing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 17/552,704

(22) Filed: Dec. 16, 2021

(65) Prior Publication Data
US 2022/0210060 A1 Jun. 30, 2022

(30) Foreign Application Priority Data
Dec. 25, 2020 (CN) .......................... 202011566608.2

(51) Int. Cl.
*H04L 45/586* (2022.01)
*H04L 12/46* (2006.01)
*H04L 45/42* (2022.01)
*H04L 45/745* (2022.01)

(52) U.S. Cl.
CPC ........ *H04L 45/586* (2013.01); *H04L 12/4641* (2013.01); *H04L 45/42* (2013.01); *H04L 45/745* (2013.01)

(58) Field of Classification Search
CPC ..... H04L 45/586; H04L 45/42; H04L 45/745; H04L 12/4641
See application file for complete search history.

(56) References Cited

U.S. PATENT DOCUMENTS

| | | | | |
|---|---|---|---|---|
| 7,715,310 B1* | 5/2010 | Sajassi | ...................... | H04L 1/22 709/239 |
| 8,059,527 B2* | 11/2011 | Townsley | .................. | H04J 3/22 370/242 |
| 8,625,412 B2* | 1/2014 | Voit | ...................... | H04L 12/462 709/239 |
| 8,837,521 B2* | 9/2014 | Sergeev | .................. | H04L 45/66 370/254 |

(Continued)

FOREIGN PATENT DOCUMENTS

| | | |
|---|---|---|
| EP | 2640014 A1 | 9/2013 |
| EP | 3462688 A1 | 4/2019 |

*Primary Examiner* — Blake J Rubin
(74) *Attorney, Agent, or Firm* — Womble Bond Dickinson (US) LLP

(57) ABSTRACT

A packet transmission method, device, and system for network technologies are disclosed. A first network device receives, by using a first VPLS instance a packet to be sent to a user-side device connected to the second network device. The first network device forwards, based on an association relationship between the first VPLS instance and the first VPWS instance, the packet to a second VPWS instance in the second network device by using the first VPWS instance. A VPLS instance is associated with a VPWS instance in the first network device. A packet that is received by using the VPLS instance and that is to be sent to a user-side device can be forwarded by using the associated VPWS instance, so that pressure to learn a MAC address for packet transmission is reduced, and forwarding performance of the system is ensured.

20 Claims, 9 Drawing Sheets

(56) References Cited

U.S. PATENT DOCUMENTS

| | | | |
|---|---|---|---|
| 9,049,133 B2* | 6/2015 | Boutros | H04L 45/14 |
| 9,100,213 B1* | 8/2015 | Ramanathan | H04L 12/413 |
| 9,276,769 B2* | 3/2016 | Hsiao | H04L 45/00 |
| 10,020,952 B1* | 7/2018 | Cai | H04L 12/1886 |
| 10,666,459 B1* | 5/2020 | Sajassi | H04L 12/4641 |
| 11,425,022 B1* | 8/2022 | Singh | H04L 41/5054 |
| 11,570,073 B1* | 1/2023 | Kumar | H04L 45/00 |
| 2004/0213232 A1* | 10/2004 | Regan | H04L 69/168 370/432 |
| 2008/0172497 A1* | 7/2008 | Mohan | H04L 12/66 709/249 |
| 2009/0196298 A1* | 8/2009 | Sajassi | H04L 12/4658 370/395.53 |
| 2010/0226246 A1* | 9/2010 | Proulx | H04L 41/069 370/228 |
| 2012/0087232 A1* | 4/2012 | Hanabe | H04L 41/0659 370/217 |
| 2012/0106360 A1* | 5/2012 | Sajassi | H04L 45/28 370/245 |
| 2012/0327944 A1* | 12/2012 | Zhang | H04L 45/00 370/401 |
| 2013/0176867 A1* | 7/2013 | Balus | H04L 41/0233 370/252 |
| 2014/0201374 A1* | 7/2014 | Ashwood-Smith | G06F 9/50 709/226 |
| 2016/0179598 A1 | 6/2016 | Lvin et al. | |
| 2016/0378816 A1* | 12/2016 | Colla | H04L 67/10 707/690 |
| 2017/0005922 A1* | 1/2017 | Tantsura | H04L 45/72 |
| 2017/0047999 A1* | 2/2017 | Wei | H04B 10/27 |
| 2017/0331720 A1* | 11/2017 | Brissette | H04L 63/0272 |
| 2018/0109400 A1* | 4/2018 | Brissette | H04L 45/50 |
| 2018/0359178 A1 | 12/2018 | Brissette et al. | |
| 2019/0013966 A1* | 1/2019 | Nagarajan | H04L 45/28 |
| 2019/0342119 A1 | 11/2019 | Uttaro et al. | |
| 2019/0394066 A1 | 12/2019 | Lin et al. | |
| 2020/0322183 A1* | 10/2020 | Lin | H04L 45/66 |
| 2021/0226816 A1* | 7/2021 | Holness | H04L 12/4641 |
| 2021/0273827 A1* | 9/2021 | Vairavakkalai | H04L 45/745 |
| 2021/0352007 A1* | 11/2021 | Boutros | H04L 45/66 |
| 2021/0352011 A1* | 11/2021 | Boutros | G06F 13/4022 |
| 2021/0399984 A1* | 12/2021 | He | H04L 12/4641 |
| 2022/0131721 A1* | 4/2022 | Boutros | H04L 45/16 |

* cited by examiner

Forwarding path S2: VM 1 -> CE 1 -> PE 2 -> P1 -> PE 1 -> BRAS 1
Forwarding path S3: VM 1 -> CE 1 -> PE 2 -> P1 -> PE 1 -> PE 4 -> BRAS 1

PACKET TRANSMISSION METHOD, DEVICE, AND SYSTEM

CROSS-REFERENCE TO RELATED APPLICATION

The application claims priority to Chinese Patent Application No. 202011566608.2, filed on Dec. 25, 2020, which is hereby incorporated by reference in its entirety.

TECHNICAL FIELD

This application relates to the field of network technologies, and in particular, to a packet transmission method, device, and system.

BACKGROUND

In a conventional layer 2 virtual private network (L2VPN), different provider edge (PE) devices may be configured to be connected through a virtual leased line pseudo wire (VLL PW). The different PE devices forward a packet through the VLL PW between the different PE devices. This reduces pressure on the PE device to learn a media access control (MAC) address.

With a feature of the VLL PW, the conventional L2VPN can reduce pressure on a PE device in the network to learn a MAC address. However, with the development of technologies, currently all types of telecommunications services are evolving to an Ethernet virtual private network (EVPN) solution. Because EVPN signaling cannot support a VLL PW, a PE device in a current EVPN needs to learn a MAC address to forward a packet. As a result, pressure on the PE device to learn the MAC address is high, and a MAC entry in the PE device is complex, which may affect packet forwarding performance of a network system.

SUMMARY

The application provides a packet transmission method, device, and system, to reduce pressure on a network device to learn a MAC address, simplify a MAC entry of the network device, and help ensure packet forwarding performance of a network system including the network device. The technical solutions of the application are as follows:

In at least one embodiment, a packet transmission method is provided. The method is applied to a system including a first network device and a second network device, the first network device is a device in a virtual private LAN service (VPLS) network, and the second network device is a device in a virtual private wire service (VPWS) network. The method includes: The first network device receives a first packet by using a first VPLS instance in the first network device, where the first packet is a packet to be sent to a first user-side device connected to the second network device; the first network device determines a first VPWS instance in the first network device based on an association relationship between the first VPLS instance and the first VPWS instance; and the first network device forwards the first packet to a second VPWS instance in the second network device by using the first VPWS instance, where the first VPWS instance and the second VPWS instance are VPWS instances used to bear a same service. The first user-side device may be user equipment on a first user side or a network device on the first user side.

For example, the first network device forwards the first packet to the second VPWS instance in the second network device based on a routing and forwarding table of the first VPWS instance. The routing and forwarding table of the first VPWS instance described herein may be an association forwarding table of the first VPWS instance, and the routing and forwarding table of the first VPWS instance may be used to record a correspondence between a port identifier and association indication information. The port identifier is used to indicate a port corresponding to corresponding association indication information in the first VPWS instance, and the association indication information is used to indicate a remote device (for example, the second network device) of the first network device to determine a VPWS instance (for example, the second VPWS instance) corresponding to the first VPWS instance. For example, the association indication information may be an identifier of a virtual private network (VPN) service borne in a VPWS instance in the remote device. For example, in a multi-protocol label switching (MPLS) network, the association indication information may be a VPN service label. In a segment routing internet protocol version 6 (SRv6) network, the association indication information may be a segment identifier (SID) of a VPN service.

According to the technical solutions provided in the application, the first VPLS instance in the first network device is associated with the first VPWS instance in the first network device, so that interconnection between the first VPLS instance and the first VPWS instance can be implemented in the first network device. After receiving, by using the first VPLS instance, the first packet destined for the first user-side device connected to the second network device, the first network device may forward the first packet to the second VPWS instance in the second network device by using the first VPWS instance associated with the first VPLS instance. In this way, the first network device can forward a packet to be sent to the first user-side device without learning a MAC address of the first user-side device. This helps reduce pressure on the first network device to learn the MAC address, simplify a MAC entry of the first network device, and ensure packet forwarding performance of the entire network system.

In an embodiment, the association relationship is a binding relationship. That the first network device receives a first packet by using a first VPLS instance in the first network device includes: The first network device receives the first packet through a first port of the first VPLS instance. That the first network device determines a first VPWS instance in the first network device based on an association relationship between the first VPLS instance and the first VPWS instance includes: The first network device determines, based on a fact that a port through which the first packet is received is the first port, the first VPWS instance that has a binding relationship with the first VPLS instance. The first port in the first VPLS instance may be a port that is on the first network device and that is connected to the first VPLS instance, and the first port may be a physical interface or a logical interface that is on the first network device and that is used to send and receive packets.

According to the technical solutions provided in the application, the first VPLS instance may be bound to the first VPWS instance by using the first port in the first VPLS instance (that is, the first port on the first network device may be bound to the first VPWS instance), so that the first VPLS instance is associated with the first VPWS instance. This can help the first network device determine the first VPWS instance associated with the first VPLS instance to forward a packet to be sent to the first user-side device. In this way, the first network device can forward a packet to be sent to the first user-side device without learning the MAC address of the first user-side device. This helps reduce pressure on the first network device to learn the MAC address, simplify the MAC entry of the first network device, and ensure packet forwarding performance of the entire network system.

In an embodiment, the method further includes: The first network device receives a second packet through a second port of a second VPLS instance in the first network device, where the second packet is a packet to be sent to a second user-side device connected to the second network device; the first network device determines, based on a fact that a port through which the second packet is received is the second port, a third VPWS instance that is in the first network device and that has a binding relationship with the second VPLS instance; and the first network device forwards the second packet to a fourth VPWS instance in the second network device by using the third VPWS instance, where the third VPWS instance and the fourth VPWS instance are VPWS instances used to bear a same service. The second user-side device may be user equipment on a second user side or a network device on the second user side. The second port may be a port that is on the first network device and that is connected to the second VPLS instance, and the second port may be a physical interface or a logical interface that is on the first network device and that is used to send and receive packets.

According to the technical solutions provided in the application, the second VPLS instance in the first network device may be bound to the third VPWS instance in the first network device by using the second port in the second VPLS instance (that is, the second port on the first network device may be bound to the third VPWS instance), so that the second VPLS instance is associated with the third VPWS instance, and interconnection between the second VPLS instance and the second VPWS instance can be implemented in the first network device. This helps the first network device forward the second packet to the fourth VPWS instance in the second network device by using the third VPWS instance associated with the second VPLS instance after receiving, by using the second VPLS instance, the second packet destined for the second user-side device connected to the second network device. In this way, the first network device can forward a packet to be sent to the second user-side device without learning a MAC address of the second user-side device. This helps reduce pressure on the second network device to learn the MAC address, simplify a MAC entry of the second network device, and ensure packet forwarding performance of the entire network system.

In an embodiment, the method further includes: The first network device receives, by using the first VPWS instance in the first network device, a third packet sent by the second VPWS instance in the second network device; and the first network device forwards the third packet based on the first VPLS instance in the first network device that is associated with the first VPWS instance.

According to the technical solutions provided in the application, the first VPLS instance in the first network device is associated with the first VPWS instance in the first network device, so that interconnection between the first VPLS instance and the first VPWS instance can be implemented in the first network device, the second network device can forward a packet to the first VPWS instance in the first network device by using the second VPWS instance in the second network device, and the second network device can forward the packet according to a VPWS forwarding mechanism without learning a MAC address of a user-side device. This helps reduce pressure on the second network device to learn a MAC address, and simplify a MAC entry of the second network device. In addition, the first network device can also forward, according to the VPWS forwarding mechanism, a packet to be sent to a user-side device connected to the second network device without learning a MAC address of the user-side device. This helps reduce pressure on the first network device to learn the MAC address, and simplify a MAC entry of the first network device.

In an embodiment, that the first network device forwards the third packet based on the first VPLS instance in the first network device that is associated with the first VPWS instance includes: The first network device determines, based on a destination address carried in the third packet, a first virtual port corresponding to the destination address in the first VPWS instance, where the first virtual port is used to indicate the first VPLS instance; and the first network device forwards the third packet based on the first virtual port.

According to the technical solutions provided in the application, the first virtual port of the first VPWS instance in the first network device may indicate the first VPLS instance in the first network device, and the first VPLS instance may be used as a port member of the first VPWS instance. In this manner, the first VPLS instance is bound to the first VPWS instance, so that the first VPLS instance is associated with the first VPWS instance, and interconnection between the first VPLS instance and the first VPWS instance is implemented in the first network device. In this way, both the first network device and the second network device can perform packet forwarding according to the VPWS forwarding mechanism without learning a MAC address of a user-side device. This helps reduce pressure on the first network device and the second network device to learn the MAC address, and simplify MAC entries of the first network device and the second network device.

In an embodiment, the destination address is a broadcast address. That the first network device determines, based on a destination address carried in the third packet, a first virtual port corresponding to the destination address in the first VPWS instance includes: The first network device determines, based on the destination address carried in the third packet, one or more virtual ports corresponding to the destination address in the first VPWS instance, where the one or more virtual ports include the first virtual port. For example, the third packet is a packet sent by a user-side device when the user-side device requests to access a broadband access device, and the destination address carried in the third packet is a broadcast address. In an embodiment, the destination address may alternatively be a unicast address. For example, the third packet is a packet that is sent by a user-side device after the user-side device accesses a broadband access device and that is used to obtain data from the broadband access device, and the destination address carried in the third packet is a unicast address.

According to the technical solutions provided in the application, the first network device may determine, based on the destination address carried in the third packet, one or more virtual ports corresponding to the destination address, and may broadcast the third packet based on the one or more virtual ports, so that the technical solutions provided in the application can be applied to a packet broadcast scenario. In addition, the first network device may dynamically select a broadband access device based on traffic of a user-side device to provide a broadband access service for the user-side device, thereby improving resource usage of a broadband resource pool (for example, a resource pool including a plurality of broadband access devices) and flexibility of forwarding traffic of the user-side device by the first network device. In a possible case, the broadcast manner may be used in a scenario in which a user accesses a broadband device by dialing up for the first time, and after a broadband access device suitable for providing a service is determined in the resource pool in the broadcast manner, in a subsequent access scenario, the determined broadband access device may be used as a device for providing a service, to ensure stability of user access services.

In an embodiment, that the first network device forwards the third packet based on the first virtual port includes: The first network device determines a routing and forwarding table of the first VPLS instance based on the first virtual port; and the first network device forwards the third packet based on the routing and forwarding table of the first VPLS instance. For example, the first network device determines the first VPLS instance based on the first virtual port, and then determines the routing and forwarding table of the first VPLS instance. For example, the routing and forwarding table of the first VPLS instance described herein may be a MAC forwarding table of the first VPLS instance.

In an embodiment, that the first network device forwards the third packet based on the routing and forwarding table of the first VPLS instance includes: The first network device determines a first egress port of the third packet in the first VPLS instance based on the routing and forwarding table of the first VPLS instance and the destination address carried in the third packet; and the first network device forwards the third packet through the first egress port of the third packet based on a fact that the first egress port of the third packet in the first VPLS instance is in an available state. In some implementation scenarios, the available state may also be referred to as a UP state. For example, the routing and forwarding table of the first VPLS instance may record at least two egress ports of the third packet, and the at least two egress ports may include a main port and a backup port. The first network device may determine the main port as the first egress port of the third packet.

According to the technical solutions provided in the application, when the first egress port of the third packet in the first VPLS instance is in an available state, the first network device forwards the third packet through the first egress port, so that the first network device can successfully forward the third packet, and a failure in forwarding the third packet because the first egress port is unavailable and the first network device forwards the third packet through the first egress port can be avoided.

In an embodiment, the system further includes a third network device, and the third network device is a device in the VPLS network. That the first network device forwards the third packet based on the routing and forwarding table of the first VPLS instance further includes: The first network device forwards, based on a fact that the first egress port of the third packet in the first VPLS instance is in an unavailable state, the third packet to a third VPLS instance in the third network device by using the first VPLS instance, where the first VPLS instance in the first network device and the third VPLS instance in the third network device are VPLS instances used to bear a same service. In some implementation scenarios, the unavailable state is also referred to as a DOWN state. For example, the routing and forwarding table of the first VPLS instance may record at least two egress ports of the third packet, the at least two egress ports may include a main port and a backup port, and the backup port may be used for communication between the first VPLS instance and the third VPLS instance in the third network device. The first network device may forward the third packet to the third VPLS instance in the third network device through the backup port.

According to the technical solutions provided in the application, when the first egress port of the third packet in the first VPLS instance is in an unavailable state, the first network device forwards the third packet to the third VPLS instance in the third network device by using the first VPLS instance in the first network device. The third network device may determine the egress port of the third packet in the third VPLS instance to forward the third packet, so as to avoid loss of the third packet because the first egress port of the third packet in the first VPLS instance is unavailable, and help reduce a packet loss rate of the network system.

In an embodiment, that the first network device forwards the third packet based on the routing and forwarding table of the first VPLS instance further includes: The first network device determines, based on the routing and forwarding table of the first VPLS instance, that all ports of the first VPLS instance are in an unavailable state; and the first network device forwards, based on the fact that all the ports of the first VPLS instance are in an unavailable state, the third packet to a fifth VPWS instance in the third network device by using the first VPWS instance in the first network device, where the first VPWS instance in the first network device and the fifth VPWS instance in the third network device are VPWS instances used to bear a same service. The routing and forwarding table of the first VPWS instance herein may be a MAC forwarding table of the first VPWS instance. For example, the routing and forwarding table of the first VPWS instance includes at least two port identifiers corresponding to an address that matches the destination address carried in the third packet. The at least two port identifiers indicate at least two ports in the first VPWS instance, the at least two ports include a main port and a backup port, and the backup port can be used to communicate with the fifth VPWS instance in the third network device. The first network device may forward the third packet to the fifth VPWS instance in the third network device through the backup port in the first VPWS instance.

According to the technical solutions provided in the application, when all the ports of the first VPLS instance in the first network device are in an unavailable state, the first network device forwards the third packet to the fifth VPWS instance in the third network device by using the first VPWS instance that is in the first network device and that is associated with the first VPLS instance, and the third network device forwards the third packet by using the fifth VPWS instance. In this way, loss of the third packet caused by unavailability of the port of the first VPLS instance can be avoided, and a packet loss rate of the network system can be reduced.

In an embodiment, before the first network device forwards the third packet based on the first virtual port, the method further includes: The first network device receives a fourth packet through a third port of the first VPLS instance; and the first network device generates a forwarding entry in the routing and forwarding table of the first VPLS instance based on a source address carried in the fourth packet and the third port, where a destination address in the forwarding entry is the source address carried in the fourth packet, and a port identifier in the forwarding entry is used to indicate the third port. For example, the routing and forwarding table of the first VPLS instance may be a MAC forwarding table of the first VPLS instance.

According to the technical solutions provided in the application, the first network device receives the fourth packet through the third port of the first VPLS instance in the first network device, and generates the forwarding entry in the routing and forwarding table of the first VPLS instance based on the source address carried in the fourth packet and the third port, so that after receiving the third packet, the first network device can forward the third packet based on the destination address carried in the third packet and the routing and forwarding table of the first VPLS instance.

In an embodiment, that the first network device determines, based on a destination address carried in the third packet, a first virtual port corresponding to the destination address in the first VPWS instance includes: The first network device determines the first virtual port corresponding to the destination address based on a fact that a port corresponding to the destination address in the routing and forwarding table of the first VPWS instance of the first network device is a virtual port. The routing and forwarding table of the first VPWS instance described herein may be a MAC forwarding table of the first VPWS instance.

In an embodiment, that the first network device determines the first virtual port corresponding to the destination address based on a fact that a port corresponding to the destination address in the routing and forwarding table of the first VPWS instance of the first network device is a virtual port includes: The first network device determines the first virtual port based on the destination address and the port identifier in the routing and forwarding table of the first VPWS instance, where the port identifier is used to indicate the first virtual port corresponding to the destination address in the first VPWS instance and a type of the first virtual port; or the first network device determines the first virtual port based on the destination address, the port identifier, and a port type in the routing and forwarding table of the first VPWS instance, where the port identifier indicates a port corresponding to the destination address in the first VPWS instance, and the port type indicates that a type of the port is a virtual port type.

According to the technical solutions provided in the application, the port identifier may be used to indicate a port and a type of the port, or the port identifier may be used to indicate only a port. In a case in which the port identifier may be used to indicate both a port and a type of the port, the routing and forwarding table of the first VPWS instance of the first network device may record a correspondence between an address and a port identifier. When the port identifier is used to indicate only a port, the routing and forwarding table of the first VPWS instance of the first network device may record a correspondence between an address, a port identifier, and a port type. Regardless of the indication manner, the first network device may determine the port type based on the routing and forwarding table of the first VPWS instance. This helps improve accuracy of determining, by the first network device based on the routing and forwarding table of the first VPWS instance, the first virtual port corresponding to the destination address carried in the third packet.

In an embodiment, before the first network device determines, based on a destination address carried in the third packet, a first virtual port corresponding to the destination address in the first VPWS instance, the method further includes: The first network device receives a fifth packet by using the first VPLS instance in the first network device; and the first network device generates a forwarding entry in the routing and forwarding table of the first VPWS instance based on a source address carried in the fifth packet and the first VPLS instance, where a destination address in the forwarding entry is the source address carried in the fifth packet, and a port identifier in the forwarding entry is used to indicate the first virtual port. The routing and forwarding table of the first VPWS instance described herein may be a MAC forwarding table of the first VPWS instance.

According to the technical solutions provided in the application, the first network device receives the fifth packet by using the first VPLS instance in the first network device, and generates the forwarding entry in the routing and forwarding table of the first VPWS instance of the first network device based on the source address carried in the fifth packet and the first VPLS instance. In this way, after receiving the third packet, the first network device can determine, based on the routing and forwarding table of the first VPLS instance, the first virtual port corresponding to the destination address carried in the third packet, and determine the first VPLS instance indicated by the first virtual port, so as to determine the first VPLS instance associated with the first VPLS instance, and forward the third packet by using the first VPLS instance associated with the first VPLS instance.

In an embodiment, the first VPWS instance includes a port of a virtual port type. A port of a virtual port type may be referred to as a virtual port, and a virtual port in the first VPWS instance may indicate a VPLS instance in the first network device.

In an embodiment, the first VPWS instance further includes a port of an Ethernet virtual private network peer (EVPN Peer) type. A port of an EVPN Peer type may be referred to as an EVPN Peer port, and the EVPN Peer port may be used by the first network device to communicate with a remote device, for example, a remote PE device.

In an embodiment, the first VPLS instance includes at least one of a port of an access circuit (AC) type and a port of an EVPN Peer type. A port of an AC type may be referred to as an AC port, and a port of an EVPN Peer type may be referred to as an EVPN Peer port. In the first network device, the AC port may be used by the first network device to communicate with a broadband access device, for example, a broadband remote access server (BRAS). The EVPN Peer port may be used by the first network device to communicate with a remote device, for example, a remote PE device.

In at least one embodiment, a packet transmission system is provided. The system includes a first network device and a second network device, the first network device is a device in a VPLS network, and the second network device is a device in a VPWS network.

The first network device is configured to: receive a first packet by using a first VPLS instance in the first network device, determine a first VPWS instance in the first network device based on an association relationship between the first VPLS instance and the first VPWS instance, and forward the first packet to a second VPWS instance in the second network device by using the first VPWS instance, where the first packet is a packet to be sent to a first user-side device connected to the second network device, and the first VPWS instance and the second VPWS instance are VPWS instances used to bear a same service.

The second network device is configured to forward the first packet by using the second VPWS instance in the second network device.

In an embodiment, the association relationship is a binding relationship. The first network device is configured to: receive the first packet through a first port of the first VPLS instance, and determine, based on a fact that a port through which the first packet is received is the first port, the first VPWS instance that has a binding relationship with the first VPLS instance.

In an embodiment, the first network device is further configured to: receive a second packet through a second port of a second VPLS instance in the first network device; determine, based on a fact that a port through which the second packet is received is the second port, a third VPWS instance that is in the first network device and that has a binding relationship with the second VPLS instance; and forward the second packet to a fourth VPWS instance in the second network device by using the third VPWS instance, where the second packet is a packet to be sent to a second user-side device connected to the second network device, and the third VPWS instance and the fourth VPWS instance are VPWS instances used to bear a same service.

The second network device is further configured to forward the second packet by using the fourth VPWS instance.

In an embodiment, the second network device is further configured to send a third packet to the first VPWS instance in the first network device by using the second VPWS instance in the second network device.

The first network device is further configured to forward the third packet based on the first VPLS instance in the first network device that is associated with the first VPWS instance.

In an embodiment, the first network device is configured to: determine, based on a destination address carried in the third packet, a first virtual port corresponding to the destination address in the first VPWS instance, where the first virtual port is used to indicate the first VPLS instance, and forward the third packet based on the first virtual port.

In an embodiment, the destination address is a broadcast address, and the first network device is configured to determine, based on the destination address carried in the third packet, one or more virtual ports corresponding to the destination address in the first VPWS instance, where the one or more virtual ports include the first virtual port.

In an embodiment, the first network device is configured to determine a routing and forwarding table of the first VPLS instance based on the first virtual port, and forward the third packet based on the routing and forwarding table of the first VPLS instance. For example, the routing and forwarding table of the first VPLS instance described herein may be a MAC forwarding table of the first VPLS instance.

In an embodiment, the first network device is configured to: determine a first egress port of the third packet in the first VPLS instance based on the routing and forwarding table of the first VPLS instance and the destination address carried in the third packet; and forward the third packet through the first egress port of the third packet based on a fact that the first egress port of the third packet in the first VPLS instance is in an available state.

In an embodiment, the system further includes a third network device, and the third network device is a device in the VPLS network. The first network device is further configured to forward, based on a fact that the first egress port of the third packet in the first VPLS instance is in an unavailable state, the third packet to a third VPLS instance in the third network device by using the first VPLS instance, where the first VPLS instance in the first network device and the third VPLS instance in the third network device are VPLS instances used to bear a same service. The third network device is configured to forward the third packet by using the third VPLS instance in the third network device.

In an embodiment, the first network device is further configured to: determine, based on the routing and forwarding table of the first VPLS instance, that all ports of the first VPLS instance are in an unavailable state; and forward, based on the fact that all the ports of the first VPLS instance are in an unavailable state, the third packet to a fifth VPWS instance in the third network device by using the first VPWS instance in the first network device, where the first VPWS instance in the first network device and the fifth VPWS instance in the third network device are VPWS instances used to bear a same service. The third network device is further configured to forward the third packet by using a VPLS instance in the third network device that is associated with the fifth VPWS instance.

In an embodiment, the first network device is further configured to: before forwarding the third packet based on the first virtual port, receive a fourth packet through a third port of the first VPLS instance; and generate a forwarding entry in the routing and forwarding table of the first VPLS instance based on a source address carried in the fourth packet and the third port, where a destination address in the forwarding entry is the source address carried in the fourth packet, and a port identifier in the forwarding entry is used to indicate the third port.

In an embodiment, the first network device is configured to determine the first virtual port corresponding to the destination address based on a fact that a port corresponding to the destination address in a routing and forwarding table of the first VPWS instance of the first network device is a virtual port. For example, the routing and forwarding table of the first VPWS instance described herein may be a MAC forwarding table of the first VPWS instance.

In an embodiment, the first network device is configured to determine the first virtual port based on the destination address and the port identifier in the routing and forwarding table of the first VPWS instance, where the port identifier is used to indicate the first virtual port corresponding to the destination address in the first VPWS instance and a type of the first virtual port; or determine the first virtual port based on the destination address, the port identifier, and a port type in the routing and forwarding table of the first VPWS instance, where the port identifier indicates a port corresponding to the destination address in the first VPWS instance, and the port type indicates that a type of the port is a virtual port type. The routing and forwarding table of the first VPWS instance may be a MAC forwarding table of the first VPWS instance.

In an embodiment, the first network device is further configured to: before determining, based on the destination address carried in the third packet, the first virtual port corresponding to the destination address in the first VPWS instance, receive a fifth packet by using the first VPLS instance in the first network device, and generate a forwarding entry in the routing and forwarding table of the first VPWS instance based on a source address carried in the fifth packet and the first VPLS instance, where a destination address in the forwarding entry is the source address carried in the fifth packet, and a port identifier in the forwarding entry is used to indicate the first virtual port.

In an embodiment, the first VPWS instance includes a port of a virtual port type.

In an embodiment, the first VPWS instance further includes a port of an EVPN Peer type.

In an embodiment, the first VPLS instance includes at least one of a port of an AC type and a port of an EVPN Peer type.

In an embodiment, the first network device, the second network device, and the third network device are all PE devices.

In at least one embodiment, a first network device is provided. The first network device is in a packet transmission system, the system further includes a second network device, the first network device is a device in a VPLS network, and the second network device is a device in a VPWS network. The first network device includes:

a receiving module, configured to receive a first packet by using a first VPLS instance in the first network device, where the first packet is a packet to be sent to a first user-side device connected to the second network device;

a processing module, configured to determine a first VPWS instance in the first network device based on an association relationship between the first VPLS instance and the first VPWS instance; and a forwarding module, configured to forward the first packet to a second VPWS instance in the second network device by using the first VPWS instance, where the first VPWS instance and the second VPWS instance are VPWS instances used to bear a same service.

In an embodiment, the association relationship is a binding relationship. The receiving module is configured to receive the first packet through a first port of the first VPLS instance. The processing module is configured to determine, based on a fact that a port through which the first packet is received is the first port, the first VPWS instance that has a binding relationship with the first VPLS instance.

In an embodiment, the receiving module is further configured to receive a second packet through a second port of a second VPLS instance in the first network device, where the second packet is a packet to be sent to a second user-side device connected to the second network device.

The processing module is further configured to determine, based on a fact that a port through which the second packet is received is the second port, a third VPWS instance that is in the first network device and that has a binding relationship with the second VPLS instance.

The forwarding module is further configured to forward the second packet to a fourth VPWS instance in the second network device by using the third VPWS instance, where the third VPWS instance and the fourth VPWS instance are VPWS instances used to bear a same service.

In an embodiment, the receiving module is further configured to receive, by using the first VPWS instance in the first network device, a third packet sent by the second VPWS instance in the second network device.

The forwarding module is further configured to forward the third packet based on the first VPLS instance in the first network device that is associated with the first VPWS instance.

In an embodiment, the forwarding module is configured to: determine, based on a destination address carried in the third packet, a first virtual port corresponding to the destination address in the first VPWS instance, where the first virtual port is used to indicate the first VPLS instance, and forward the third packet based on the first virtual port.

In an embodiment, the destination address is a broadcast address, and the forwarding module is configured to determine, based on the destination address carried in the third packet, one or more virtual ports corresponding to the destination address in the first VPWS instance, where the one or more virtual ports include the first virtual port.

In an embodiment, the forwarding module is configured to determine a routing and forwarding table of the first VPLS instance based on the first virtual port, and forward the third packet based on the routing and forwarding table of the first VPLS instance.

In an embodiment, the forwarding module is further configured to: determine a first egress port of the third packet in the first VPLS instance based on the routing and forwarding table of the first VPLS instance and the destination address carried in the third packet; and forward the third packet through the first egress port of the third packet based on a fact that the first egress port of the third packet in the first VPLS instance is in an available state.

In an embodiment, the system further includes a third network device, and the third network device is a device in the VPLS network. The forwarding module is further configured to forward, based on a fact that the first egress port of the third packet in the first VPLS instance is in an unavailable state, the third packet to a third VPLS instance in the third network device by using the first VPLS instance, where the first VPLS instance in the first network device and the third VPLS instance in the third network device are VPLS instances used to bear a same service.

In an embodiment, the forwarding module is further configured to: determine, based on the routing and forwarding table of the first VPLS instance, that all ports of the first VPLS instance are in an unavailable state; and forward, based on the fact that all the ports of the first VPLS instance are in an unavailable state, the third packet to a fifth VPWS instance in the third network device by using the first VPWS instance in the first network device, where the first VPWS instance in the first network device and the fifth VPWS instance in the third network device are VPWS instances used to bear a same service.

In an embodiment, the receiving module is further configured to: before the forwarding module forwards the third packet based on the first virtual port, receive a fourth packet through a third port of the first VPLS instance.

The processing module is further configured to generate a forwarding entry in the routing and forwarding table of the first VPLS instance based on a source address carried in the fourth packet and the third port, where a destination address in the forwarding entry is the source address carried in the fourth packet, and a port identifier in the forwarding entry is used to indicate the third port.

In an embodiment, the determining, based on a destination address carried in the third packet, a first virtual port corresponding to the destination address in the first VPWS instance includes: determining the first virtual port corresponding to the destination address based on a fact that a port corresponding to the destination address in the routing and forwarding table of the first VPWS instance of the first network device is a virtual port. For example, the routing and forwarding table of the first VPWS instance described herein may be a MAC forwarding table of the first VPWS instance.

In an embodiment, the determining the first virtual port corresponding to the destination address based on a fact that a port corresponding to the destination address in the routing and forwarding table of the first VPWS instance of the first network device is a virtual port includes: determining the first virtual port based on the destination address and the port identifier in the routing and forwarding table of the first VPWS instance, where the port identifier is used to indicate the first virtual port corresponding to the destination address in the first VPWS instance and a type of the first virtual port; or determining the first virtual port based on the destination address, the port identifier, and a port type in the routing and forwarding table of the first VPWS instance, where the port identifier indicates a port corresponding to the destination address in the first VPWS instance, and the port type indicates that a type of the port is a virtual port type.

In an embodiment, the receiving module is further configured to: before the forwarding module determines, based on the destination address carried in the third packet, the first virtual port corresponding to the destination address in the first VPWS instance, receive a fifth packet by using the first VPLS instance in the first network device.

The processing module is further configured to generate a forwarding entry in the routing and forwarding table of the first VPWS instance based on a source address carried in the fifth packet and the first VPLS instance, where a destination address in the forwarding entry is the source address carried in the fifth packet, and a port identifier in the forwarding entry is used to indicate the first virtual port.

In an embodiment, the first VPWS instance includes a port of a virtual port type.

In an embodiment, the first VPWS instance further includes a port of an EVPN Peer type.

In an embodiment, the first VPLS instance includes at least one of a port of an AC type and a port of an EVPN Peer type.

The modules in embodiments described herein may be implemented based on software, hardware, or a combination of software and hardware, and the modules may be randomly combined or divided based on an implementation.

In at least one embodiment, a network device is provided. The network device includes a memory and a processor.

The memory is configured to store a computer program.

The processor is configured to execute the computer program stored in the memory, to perform the packet transmission methods as described herein.

In at least one embodiment, a computer-readable storage medium is provided. The computer-readable storage medium stores a computer program, and when the computer program is executed by a processor, the packet transmission method as described herein is performed.

In at least one embodiment, a computer program product that includes instructions is provided, and when the computer program product runs on a computer, the computer is enabled to perform the packet transmission method as described herein.

In at least one embodiment, a chip is provided. The chip includes a programmable logic circuit and/or program instructions, and when the chip operates, the chip is configured to implement the packet transmission method as described herein.

In at least one embodiment, a packet transmission system is provided. The packet transmission system includes a first network device and a second network device, and the first network device is the network device as described herein. The first network device is configured to: receive, by using a VPLS instance in the first network device, a packet to be sent to a user-side device connected to the second network device, and forward the packet to a VPWS instance in the second network device by using a VPWS instance that is in the first network device and that is associated with the VPLS instance. The second network device is configured to forward the packet to the user-side device by using the VPWS instance in the second network device.

The technical solutions provided in the application bring the following beneficial effects:

The application provides a packet transmission method, device, and system. The system includes a first network device in a VPLS network and a second network device in a VPWS network. A first VPWS instance in the first network device and a second VPWS instance in the second network device are VPWS instances used to bear a same service. A first VPLS instance in the first network device is associated with the first VPWS instance in the first network device. After receiving, by using the first VPLS instance in the first network device, a first packet to be sent to a first user-side device connected to the second network device, the first network device determines the first VPWS instance based on an association relationship between the first VPLS instance and the first VPWS instance, and forwards the first packet to the second VPWS instance by using the first VPWS instance. In other words, the first network device forwards the first packet to the second VPWS instance in the second network device by using the first VPWS instance associated with the first VPLS instance. In this way, the first network device can forward a packet to be sent to the first user-side device without learning a MAC address of the first user-side device. This helps reduce pressure on the first network device to learn the MAC address, simplify a MAC entry of the first network device, and ensure packet forwarding performance of the network system. In addition, the second network device can forward the first packet to the first user-side device according to a VPWS forwarding mechanism by using the second VPWS instance, so that the second network device can forward a packet to be sent to the first user-side device without learning the MAC address of the first user-side device. This helps reduce pressure on the second network device to learn the MAC address, and simplify a MAC entry of the second network device.

DESCRIPTION OF EMBODIMENTS

Figure 1:
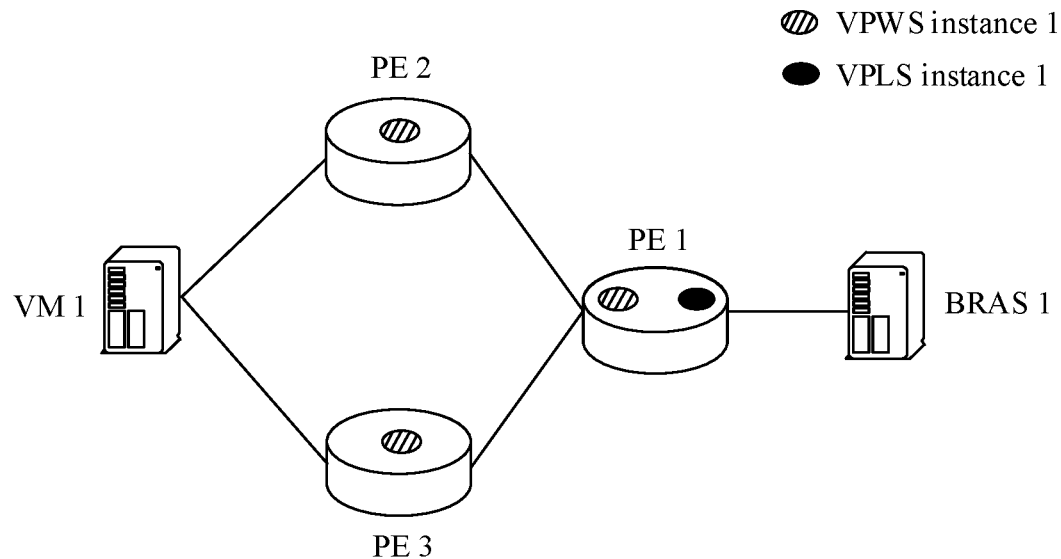
FIG. 1 is a schematic diagram of a structure of an EVPN according to an embodiment of the application.

To make principles, technical solutions, and advantages of the application clearer, the following further describes implementations of the application in detail with reference to accompanying drawings.

In a conventional L2VPN, PE devices can forward a packet through a VLL PW, to reduce pressure on a PE device to learn a MAC address. However, with the development of technologies, currently all types of telecommunications services are evolving to an EVPN solution. Because EVPN signaling cannot support a VLL PW, a PE device in a current EVPN needs to learn a MAC address to forward a packet. As a result, pressure on the PE device to learn the MAC address is high. The technical solutions provided in the embodiments of the application are applied to the EVPN, and can reduce pressure on a PE device to learn a MAC address. The following describes the technical solutions in the embodiments of the application.

An application scenario in the embodiments of the application is first described.

The technical solutions provided in the embodiments of the application may be applied to an EVPN. The EVPN may include a plurality of PE devices. The plurality of PE devices may communicate with each other to transfer user data. The plurality of PE devices may play corresponding roles based on different application scenarios. A user broadband access scenario is used as an example. An EVPN applied in this scenario may include a plurality of broadband access devices and a plurality of PE devices. Based on different roles played by the plurality of PE devices, the plurality of PE devices may include user access PE devices and broadband access PE devices. Each broadband access PE device may be connected to at least one broadband access device, each user access PE device is used to connect at least one user equipment to the EVPN, and each broadband access PE device may be connected to at least one user access PE device. The broadband access device is used to provide a broadband access service for user equipment mounted to a corresponding broadband access PE device (the user equipment may be mounted to a user access PE device, and mounted to a broadband access PE device by using the user access PE device).

In the EVPN applied to the user broadband access scenario, a PE device may be configured with at least one VPWS instance, and a broadband access PE device may be further configured with at least one VPLS instance. The at least one VPWS instance in the user access PE device may be in a one-to-one correspondence with the at least one VPWS instance in the broadband access PE device, and VPLS instances in the broadband access PE devices may be in a one-to-one correspondence with each other. Each VPLS instance in the broadband access PE device may correspond to (or be bound to) at least one broadband access device. In the broadband access PE device, each VPWS instance may be associated with (or corresponding to) at least one VPLS instance, and each VPLS instance may be associated with (or corresponding to) one VPWS instance. In the EVPN, after a user access PE device receives a packet sent by user equipment mounted to the user access PE device to a broadband access device, the user access PE device may forward the packet to a corresponding VPWS instance in a broadband access PE device by using a VPWS instance in the user access PE device. After receiving the packet by using the VPWS instance in the broadband access PE device, the broadband access PE device forwards the packet to the corresponding broadband access device by using a VPLS instance that is in the broadband access PE device and that is associated with the VPWS instance. The broadband access device provides a broadband access service for the user equipment based on the packet. Similarly, after a broadband access PE device receives, by using a VPLS instance in the broadband access PE device, a packet to be sent to user equipment, the broadband access PE device forwards the packet to a corresponding VPWS instance in a user access PE device by using a VPWS instance associated with the VPLS instance in the broadband access PE device. The user access PE device forwards the packet to the user equipment by using the VPWS instance in the user access PE device, so that the broadband access device provides a broadband access service for the user equipment.

The broadband access device may be a BRAS. The user equipment may be various types of devices such as a host, a user terminal, a server, or a virtual machine (VM) created on the server. The user equipment may generally be a dial-up access device, for example, an optical modem. The optical modem is also referred to as an optical modulator/demodulator or a single-port optical transceiver. A PE device may be a network device such as a router, a switch, a virtual router, or a virtual switch. PE devices may be directly connected or connected by using another network device (for example, a core device). This is not limited in the embodiments of the application.

For example, FIG. 1 is a schematic diagram of a structure of an EVPN applied to a user broadband access scenario according to an embodiment of the application. An example in which a broadband access device is a BRAS and user equipment is a VM is used for description in FIG. 1. As shown in FIG. 1, the EVPN includes BRAS 1 and three PE devices: PE 1 to PE 3 (that is, PE 1, PE 2, and PE 3). PE 1 is connected to both PE 2 and PE 3, PE 1 is connected to BRAS 1, and PE 2 and PE 3 are connected to VM 1 (that is, VM 1 is mounted to both PE 2 and PE 3, and VM 1 accesses the EVPN through PE 2 and PE 3). PE 1 to PE 3 may play different roles. PE 1 may be a broadband access PE device, and both PE 2 and PE 3 may be user access PE devices. PE 1 to PE 3 each are configured with at least one VPWS instance (only one VPWS instance, that is, VPWS instance 1, is shown in FIG. 1), and PE 1 is further configured with at least one VPLS instance (only one VPLS instance, that is, VPLS instance 1, is shown in FIG. 1). VPWS instances 1 in PE 1 to PE 3 may be in a one-to-one correspondence with each other, VPLS instance 1 in PE 1 corresponds to (or is bound to) BRAS 1, and VPWS instance 1 in PE 1 is associated with VPLS instance 1. The VPWS instances that are in a one-to-one correspondence in the PE devices may be used to bear a same service. For example, VPWS instances 1 in PE 1 to PE 3 in FIG. 1 are used to bear a same service.

For example, as shown in FIG. 1, after PE 2 receives, by using VPWS instance 1 in PE 2, a packet that is sent to BRAS 1 by VM 1 mounted to PE 2, PE 2 may forward the packet to VPWS instance 1 in PE 1 by using VPWS instance 1 in PE 2. PE 1 may forward the packet to BRAS 1 by using VPLS instance 1 in PE 1 that is associated with VPWS instance 1 in PE 1. BRAS 1 provides a broadband access service for VM 1 based on the packet. For another example, after PE 1 receives, by using VPLS instance 1 in PE 1, a packet sent by BRAS 1 to VM 1, PE 1 may forward the packet to VPWS instance 1 in PE 2 by using VPWS instance 1 in PE 1 that is associated with VPLS instance 1, and PE 2 forwards the packet to VM 1 by using VPWS instance 1 in PE 2. In an embodiment, after PE 1 receives, by using VPLS instance 1 in PE 1, a packet sent by BRAS 1 to VM 1, PE 1 may alternatively forward the packet to VPWS instance 1 in PE 3 according to a load sharing policy or an active/standby protection policy by using VPWS instance 1 in PE 1 that is associated with VPLS instance 1, and PE 3 forwards the packet to VM 1 by using VPWS instance 1 in PE 3. VPWS instance 1 in PE 1 may include two ports (for example, EVPN Peer ports) corresponding to PE 2 and PE 3, so that PE 1 can forward a packet to VPWS instance 1 in PE 2 by using VPWS instance 1 in PE 1, and can also forward a packet to VPWS instance 1 in PE 3 by using VPWS instance 1 in PE 1.

Generally, an EVPN applied to a user broadband access scenario may include a plurality of broadband access devices, a plurality of broadband access PE devices, and a plurality of user access PE devices. Each broadband access PE device may be connected to at least one user access PE device, and each broadband access PE device may be connected to at least one broadband access device. At least one user equipment may be mounted to each user access PE device, and one user equipment may be mounted to different user access PE devices. In addition, when the EVPN includes a plurality of broadband access PE devices, the plurality of broadband access PE devices may be connected to each other, to implement multi-homing protection, for example, dual-homing protection of the broadband access PE devices. For example, when a forwarding path between a broadband access PE device in the plurality of broadband access PE devices and a destination device (for example, a broadband access device) is faulty, and consequently the broadband access PE device cannot forward a packet to the destination device through the forwarding path, the broadband access PE device may send the packet to a broadband access PE device connected to the broadband access PE device, and the broadband access PE device connected to the broadband access PE device forwards the packet to the destination device, so as to implement dual-homing protection of the broadband access PE device.

Figure 2:
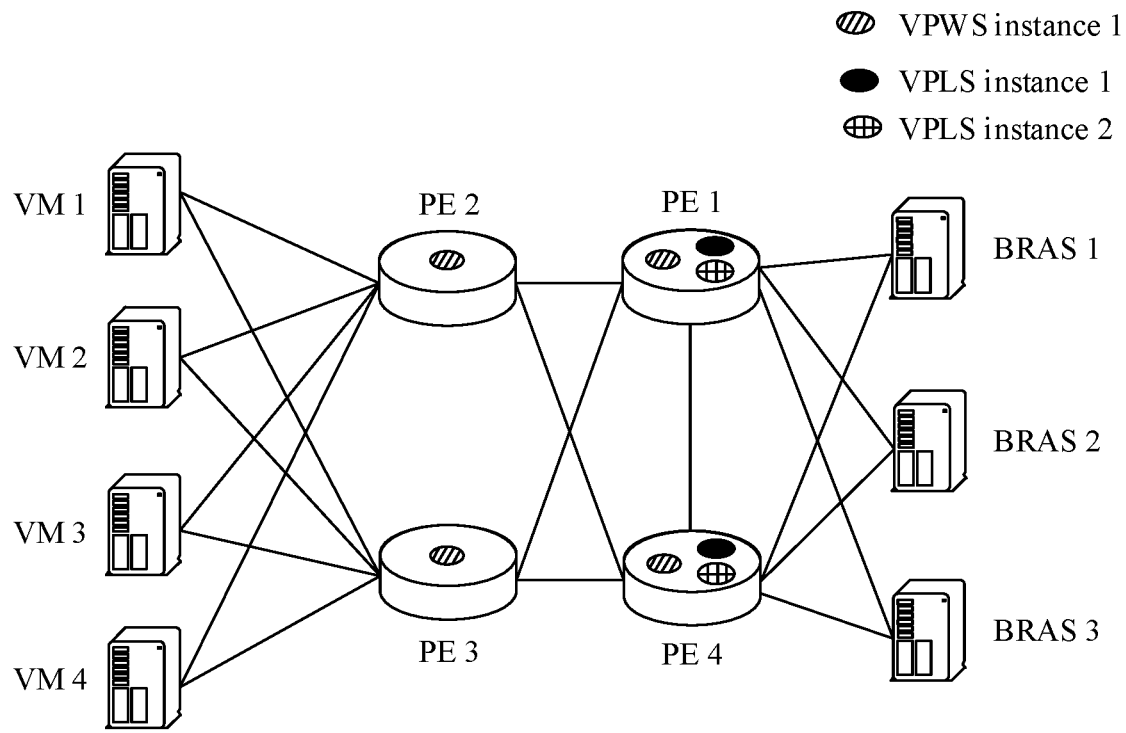
FIG. 2 is a schematic diagram of a structure of an EVPN according to another embodiment of the application.

For example, FIG. 2 is a schematic diagram of a structure of an EVPN applied to a user broadband access scenario according to another embodiment of the application. An example in which a broadband access device is a BRAS and user equipment is a VM is still used for description in FIG. 2. As shown in FIG. 2, the EVPN includes four PE devices: PE 1 to PE 4 (that is, PE 1, PE 2, PE 3, and PE 4), and three broadband access devices: BRAS 1 to BRAS 3 (that is, BRAS 1, BRAS 2, and BRAS 3). PE 1 and PE 4 each are connected to both PE 2 and PE 3, PE 1 and PE 4 each are connected to BRAS 1 to BRAS 3, PE 2 and PE 3 each are connected to VM 1 to VM 4 (that is, VM 1, VM 2, VM 3, and VM 4), and PE 1 and PE 4 are connected. PE 1 to PE 4 may play different roles. PE 1 and PE 4 may both be broadband access PE devices, and PE 2 and PE 3 may both be user access PE devices. PE 1 to PE 4 each are configured with at least one VPWS instance (only one VPWS instance, that is, VPWS instance 1, is shown in FIG. 2), and PE 1 and PE 4 each are further configured with at least one VPLS instance (two VPLS instances: VPLS instance 1 and VPLS instance 2 are shown in FIG. 2). VPWS instances in PE 1 to PE 4 are in a one-to-one correspondence with each other, and each VPLS instance in PE 1 and PE 4 corresponds to (or is bound to) at least one of BRAS 1 to BRAS 3. For example, VPLS instances 1 in PE 1 and PE 4 each correspond to BRAS 1 to BRAS 3. In PE 1 and PE 4, each VPWS instance is associated with at least one VPLS instance, and each VPLS instance is associated with one VPWS instance. For example, in PE 1 and PE 4, VPWS instance 1 is associated with both VPLS instance 1 and VPLS instance 2, and each VPLS instance in VPLS instance 1 and VPLS instance 2 is associated with one VPWS instance, that is, VPWS instance 1. The VPWS instances in the PE devices that are in a one-to-one correspondence may be used to bear a same service, and the VPLS instances that are in a one-to-one correspondence may be used to bear a same service. For example, in FIG. 2, VPWS instances 1 in PE 1 to PE 4 are in a one-to-one correspondence with each other, and VPWS instances 1 in PE 1 to PE 4 are used to bear a same service. VPLS instance 1 in PE 1 and VPLS instance 1 in PE 4 are in a one-to-one correspondence, and VPLS instances 1 in PE 1 and PE 4 are used to bear a same service. VPLS instance 2 in PE 1 and VPLS instance 2 in PE 4 are in a one-to-one correspondence, and VPLS instances 2 in PE 1 and PE 4 are used to bear a same service. In addition, VPLS instance 1 and VPLS instance 2 may bear different services.

For example, as shown in FIG. 2, after PE 2 receives, by using VPWS instance 1 in PE 2, a packet that is sent to BRAS 1 by VM 1 mounted to PE 2, PE 2 may forward the packet to VPWS instance 1 in PE 1 by using VPWS instance 1 in PE 2. PE 1 may forward the packet to BRAS 1 by using VPLS instance 1 in PE 1 that is associated with VPWS instance 1 in PE 1. BRAS 1 provides a broadband access service for VM 1 based on the packet. For another example, after PE 1 receives, by using VPLS instance 1 in PE 1, a packet sent by BRAS 1 to VM 1, PE 1 may forward the packet to VPWS instance 1 in PE 2 by using VPWS instance 1 in PE 1 that is associated with VPLS instance 1, and PE 2 forwards the packet to VM 1 by using VPWS instance 1 in PE 2. In an embodiment, after PE 1 receives, by using VPLS instance 1 in PE 1, a packet sent by BRAS 1 to VM 1, PE 1 may alternatively forward the packet to VPWS instance 1 in PE 3 according to a load sharing policy or an active/standby protection policy by using VPWS instance 1 in PE 1 that is associated with VPLS instance 1, and PE 3 forwards the packet to VM 1 by using VPWS instance 1 in PE 3. In an embodiment, after PE 1 receives, by using VPWS instance 1 in PE 1, a packet sent by VM 1 to BRAS 1, if a forwarding path between PE 1 and BRAS 1 is faulty (for example, VPLS instance 1 in PE 1 is faulty, or VPWS instance 1 in PE 1 is faulty), and consequently PE 1 cannot forward the packet to BRAS 1 through the forwarding path, PE 1 may forward the packet to VPLS instance 1 in PE 4 by using VPLS instance 1 in PE 1, and PE 4 forwards the packet to BRAS 1 by using VPLS instance 1 in PE 4, so as to implement dual-homing protection for PE 1 and PE 4. Alternatively, PE 1 may forward the packet to VPWS instance 1 in PE 4 by using VPWS instance 1 in PE 1, and PE 4 forwards the packet to BRAS 1 by using VPLS instance 1 associated with VPWS instance 1 in PE 4, so as to implement dual-homing protection for PE 1 and PE 4.

Generally, an EVPN further includes an edge access device and a core device, and PE devices may be connected by using the core device. In an EVPN applied to a user broadband access scenario, an edge access device may be connected to a user access PE device, and user equipment is connected to the user access PE device through the edge access device, that is, the user equipment is mounted to the edge access device, and is connected to the user access PE device through the edge access device. The edge access device may be, for example, a customer edge (CE) device, and the core device may be, for example, a provider (P) device. The CE device and the P device each may be a network device such as a router, a switch, a virtual router, or a virtual switch, and the CE device may alternatively be an optical line terminal (OLT). In an embodiment, in the EVPN, a P device may be configured with at least one VPWS instance, and the VPWS instance in the P device is in a one-to-one correspondence with a VPWS instance in a user access PE device and a VPWS instance in a broadband access PE device. The P device may forward a packet between the user access PE device and the broadband access PE device by using the VPWS instance in the P device.

Figure 3:
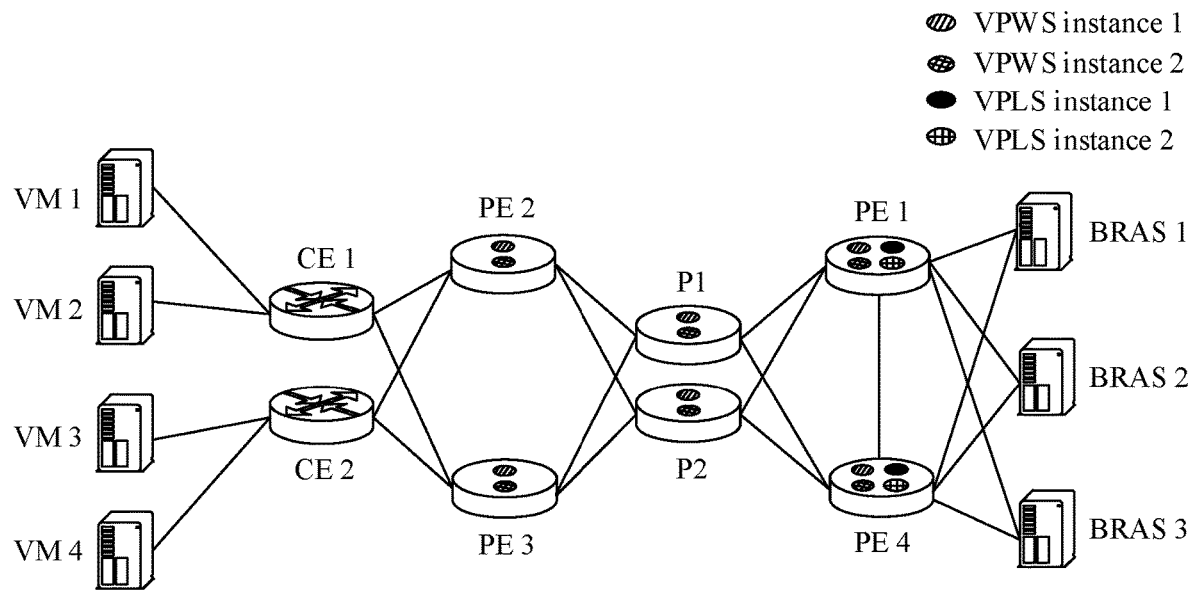
FIG. 3 is a schematic diagram of a structure of an EVPN according to another embodiment of the application.

For example, FIG. 3 is a schematic diagram of a structure of an EVPN applied to a user broadband access scenario according to another embodiment of the application. An example in which a broadband access device is a BRAS and user equipment is a VM is still used for description in FIG. 3. Refer to FIG. 3. On the basis of FIG. 2, the EVPN in FIG. 3 further includes two CE devices: CE 1 and CE 2, and two P devices: P1 and P2. Each P device in P1 and P2 is connected to PE 1 to PE 4, each CE device in CE 1 and CE 2 is connected to PE 2 and PE 3, CE 1 is connected to VM 1 and VM 2, and CE 2 is connected to VM 3 and VM 4. In other words, VM 1 and VM 2 are mounted to CE 1, and are mounted to PE 2 and PE 3 through CE 1, and VM 3 and VM 4 are mounted to CE 2, and are mounted to PE 2 and PE 3 through CE 2. Both PE 1 and PE 4 may be broadband access PE devices, and both PE 2 and PE 3 may be user access PE devices. PE 1 to PE 4, P1, and P2 each are configured with at least one VPWS instance (two VPWS instances: VPWS instance 1 and VPWS instance 2, are shown in FIG. 3), and PE 1 and PE 4 each are further configured with at least one VPLS instance (two VPLS instances: VPLS instance 1 and VPLS instance 2 are shown in FIG. 3). VPWS instances in PE 1 to PE 4, P1, and P2 are in a one-to-one correspondence with each other, and each VPLS instance in PE 1 and PE 4 corresponds to (or is bound to) at least one of BRAS 1 to BRAS 3. For example, VPLS instances 1 in PE 1 and PE 4 each correspond to BRAS 1 to BRAS 3. For example, in PE 1 and PE 4, VPWS instance 1 may be associated with both VPLS instance 1 and VPLS instance 2, and each VPLS instance in VPLS instance 1 and VPLS instance 2 is associated with one VPWS instance, that is, VPWS instance 1. VPWS instances 1 in PE 1 to PE 4, P1, and P2 are in a one-to-one correspondence with each other, and VPWS instances 1 in PE 1 to PE 4, P1, and P2 are used to bear a same service; VPWS instances 2 in PE 1 to PE 4, P1, and P2 are in a one-to-one correspondence, and VPWS instances 2 in PE 1 to PE 4, P1, and P2 are used to bear a same service. VPWS instance 1 and VPWS instance 2 may bear different services. VPLS instances 1 in PE 1 and PE 4 are in a one-to-one correspondence, and VPLS instances 1 in PE 1 and PE 4 may be used to bear a same service. VPLS instances 2 in PE 1 and PE 4 are in a one-to-one correspondence, and VPLS instances 2 in PE 1 and PE 4 may be used to bear a same service. In the EVPN shown in FIG. 3, the VPWS instances in each of the PE devices and the P devices may be in a one-to-one correspondence with the CE devices. For example, VPWS instance 1 in each of the PE devices and the P devices corresponds to CE 1, and VPWS instance 2 in each of the PE devices and the P devices corresponds to CE 2. This is not limited in an embodiment of the application.

For example, as shown in FIG. 3, after PE 2 receives, by using VPWS instance 1 in PE 2, a packet sent by VM 1 mounted to PE 2 to BRAS 1 (the packet may be forwarded to PE 2 through CE 1), PE 2 may forward the packet to VPWS instance 1 in P1 by using VPWS instance 1 in PE 2, and P1 may forward the packet to VPWS instance 1 in PE 1 by using VPWS instance 1 in P1. PE 1 may forward the packet to BRAS 1 by using VPLS instance 1 that is in PE 1 and that is associated with VPWS instance 1 in PE 1, and BRAS 1 provides a broadband access service for VM 1 based on the packet. For another example, after receiving, by using VPLS instance 1 in PE 1, a packet sent by BRAS 1 to VM 1, PE 1 forwards the packet to VPWS instance 1 in P1 by using VPWS instance 1 associated with VPLS instance 1 in PE 1. P1 may forward the packet to VPWS instance 1 in PE 2 by using VPWS instance 1 in P1, and PE 2 may forward the packet to CE 1 by using VPWS instance 1 in PE 2. CE 1 forwards the packet to VM 1 based on a destination address carried in the packet. In an embodiment, after receiving, by using VPLS instance 1 in PE 1, a packet sent by BRAS 1 to VM 1, PE 1 may alternatively forward, according to a load sharing policy or an active/standby protection policy, the packet to VPWS instance 1 in P2 by using VPWS instance 1 associated with VPLS instance 1 in PE 1. P2 may forward the packet to VPWS instance 1 in PE 3 by using VPWS instance 1 in P2, and PE 3 may forward the packet to CE 1 by using VPWS instance 1 in PE 3. CE 1 forwards the packet to VM 1 based on a destination address carried in the packet.

In the embodiments of the application, the EVPNs shown in FIG. 1 to FIG. 3 are merely examples, but are not intended to limit the technical solutions in the embodiments of the application. In an embodiment, quantities of PE devices, CE devices, P devices, and BRASs may be configured as required. A role that each type of device needs to play may be determined based on an application scenario. In addition, the EVPN may further include another network device. For example, the EVPN may further include a route reflector (RR). This is not limited in the embodiments of the application. In addition, in the embodiments of the application, for ease of description, in the user broadband access scenario, a PE device connected to user equipment is referred to as a user access PE device, and a PE device connected to a broadband access device is referred to as a broadband access PE device. However, this description is merely an example. Both the user access PE device and the broadband access PE device are PE devices. In another implementation scenario, the user access PE device and the broadband access PE device may be described by using other names, or types of the PE devices may not be distinguished. This is not limited in the embodiments of the application.

In a conventional technology, a broadband access PE device needs to learn a MAC address of user equipment connected to a user access PE device before forwarding a packet to be sent to the user equipment. This causes great pressure on the broadband access PE device to learn the MAC address, a MAC entry of the broadband access PE device is complex, and forwarding performance of a network system cannot be ensured. For example, with reference to FIG. 1 to FIG. 3, PE 1 (that is, a broadband access PE device) needs to learn a MAC address of VM 1 (that is, user equipment) connected to PE 2 (that is, a user access PE device), to forward a packet that is sent from BRAS 1 to VM 1. Consequently, PE 1 has high pressure on learning the MAC address, and a MAC entry of PE 1 is complex.

However, in the embodiments of the application, the VPLS instance and the VPWS instance in the broadband access PE device (for example, PE 1) are associated (or bound), so that interconnection between the VPWS instance and the VPLS instance is implemented in the broadband access PE device. After receiving, by using the VPLS instance in the broadband access PE device, a packet sent by a broadband access device (for example, BRAS 1) to a user-side device (for example, VM 1), the broadband access PE device may determine, based on an association relationship between the VPLS instance and the VPWS instance in the broadband access PE device, the VPWS instance associated with the VPLS instance, and forwards the packet to a VPWS instance in a user access PE device (for example, PE 2) by using the VPWS instance that is in the broadband access PE device and that is associated with the VPLS instance. In this way, the broadband access PE device can forward a packet destined for the user-side device (for example, VM 1) without learning a MAC address of the user-side device (for example, VM 1). This helps reduce pressure on the broadband access PE device to learn the MAC address, simplify a MAC entry of the broadband access PE device, and ensure packet forwarding performance of the entire network system. In addition, the user access PE device (for example, PE 2) may forward the packet by using the VPWS instance in the user access PE device, that is, the user access PE device may forward, according to a VPWS forwarding mechanism, the packet destined for the user-side device without learning the MAC address of the user-side device. This helps reduce pressure on the user access PE device to learn the MAC address, simplify a MAC entry of the user access PE device, and ensure packet forwarding performance of the entire network system. In the embodiments of the application, the user-side device may include user equipment on a user side and a network device on the user side. For example, in the scenario shown in FIG. 3, the user-side device may include VM 1 to VM 4, and CE 1 and CE 2 that are connected to VM 1 to VM 4.

The following describes in detail the technical solutions in the embodiments of the application with reference to the accompanying drawings. Before this, it should be noted that, in the application, a port of an instance (for example, a VPLS instance or a VPWS instance) may be a port that is on a device in which the instance is located and that is connected to the instance. In other words, the port is usually located on the device and may be connected to the instance. Therefore, for ease of description in the application, a port that is on a device and that is connected to an instance is referred to as a port of the instance. For example, in the following description of "first port of the first VPLS instance", the first port may be located on a first network device in which the first VPLS instance is located, and the first port may be connected to the first VPLS instance, or may be used by the first VPLS instance for packet forwarding. Therefore, the first port is described as the first port of the first VPLS instance.

Figure 4:
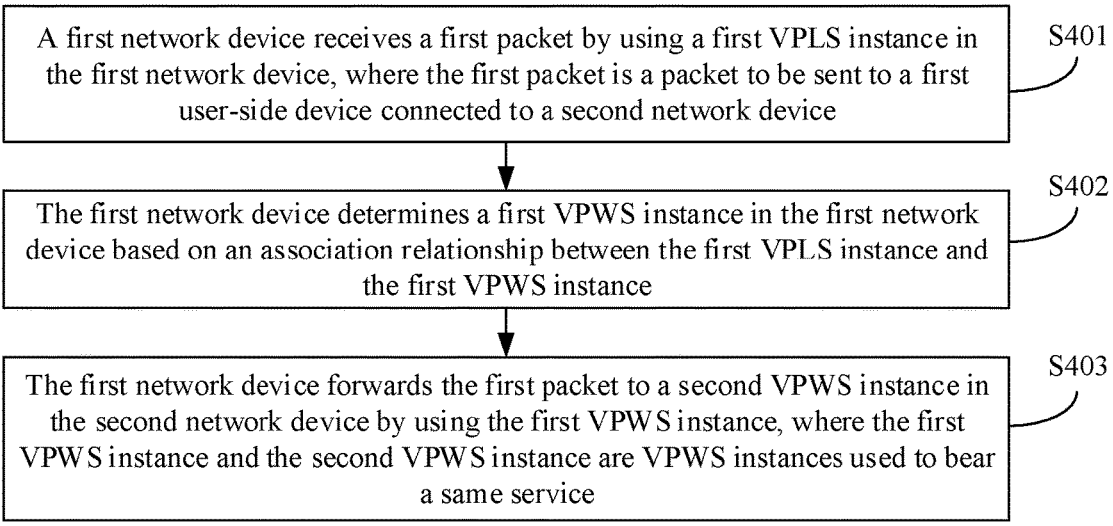
FIG. 4 is a flowchart of a packet transmission method according to an embodiment of the application.

For example, FIG. 4 is a flowchart of a packet transmission method according to an embodiment of the application. The packet transmission method may be applied to a system including a first network device and a second network device, the first network device is a device in a VPLS network, and the second network device is a device in a VPWS network. For example, as shown in FIG. 1 to FIG. 3, the first network device may be PE 1, and the second network device may be PE 2. As shown in FIG. 4, the method may include the following operations.

S401: The first network device receives a first packet by using a first VPLS instance in the first network device, where the first packet is a packet to be sent to a first user-side device connected to the second network device.

The first network device may be configured with at least one VPLS instance. Each VPLS instance may include at least one port, and each port has one type. In the VPLS instance, a type of each port may be one of an EVPN Peer type or an AC type. A port of an AC type may be referred to as an AC port, and the AC port may be used by the first network device to communicate with a broadband access device (for example, a BRAS). The first VPLS instance may be a VPLS instance in the first network device, and a type of a port in the first VPLS instance may be one of an EVPN Peer type or an AC type. For example, the first VPLS instance includes a port of an AC type and a port of an EVPN Peer type (that is, the first VPLS instance includes an AC port and an EVPN Peer port). In an embodiment, each VPLS instance in the first network device includes an AC port and an EVPN Peer port, and the VPLS instance in the first network device may further include another type of port. This is not limited in an embodiment of the application. When the first VPLS instance includes a plurality of AC ports, the plurality of AC ports may be isolated from each other, so that broadband access devices corresponding to the plurality of AC ports are isolated from each other, and the broadband access devices corresponding to the plurality of AC ports do not access each other. For example, a switch may be configured in the first VPLS instance, and the plurality of AC ports included in the first VPLS instance are controlled to be isolated from each other by using the switch, so as to avoid forming a loop. In some implementation scenarios, the VPLS instance may also be referred to as a bridge domain (BD). For example, when a BD includes both an AC port and an EVPN Peer port, the VPLS instance described in an embodiment of the application may also be referred to as a BD.

Figure 5:
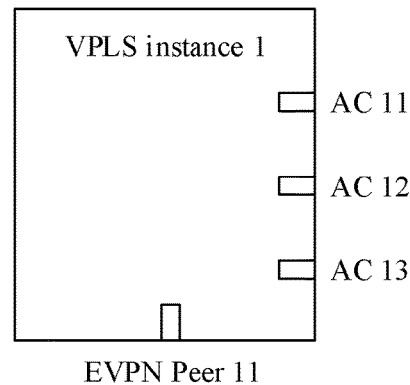
FIG. 5 is a schematic diagram of a first VPLS instance according to an embodiment of the application.

For example, FIG. 5 is a schematic diagram of the first VPLS instance in the first network device according to an embodiment of the application. The first VPLS instance may be, for example, VPLS instance 1 in PE 1 in FIG. 1 to FIG. 3. As shown in FIG. 5, VPLS instance 1 includes one EVPN Peer port: EVPN Peer 11, and three AC ports: AC 11, AC 12, and AC 13. AC 11, AC 12, and AC 13 may be used by the first network device (PE 1) to communicate with BRAS 1 to BRAS 3. EVPN Peer 11 may be used by the first network device (PE 1) to communicate with, for example, PE 4. AC 11, AC 12, and AC 13 may be isolated from each other. In addition, AC 11, AC 12, and AC 13 may be isolated from EVPN Peer 11.

The first packet may come from a broadband access device (for example, BRAS 1), and the first network device may receive the first packet by using the first VPLS instance in the first network device. In an embodiment, the first network device receives the first packet through a first port of the first VPLS instance. The first port may be a port in the first VPLS instance. For example, as shown in FIG. 5, the first port may be AC 11 in the first VPLS instance.

S402: The first network device determines a first VPWS instance in the first network device based on an association relationship between the first VPLS instance and the first VPWS instance.

The first network device may be configured with at least one VPWS instance, and one VPWS instance in the first network device may be associated with one or more VPLS instances. The first VPWS instance is a VPWS instance in the first network device, the first VPLS instance in the first network device has an association relationship with the first VPWS instance, and the first network device may determine the first VPWS instance based on the association relationship between the first VPLS instance and the first VPWS instance.

In an embodiment, the association relationship is a binding relationship, the first port in the first VPLS instance may be bound to the first VPWS instance, and the first network device may determine, based on a fact that a port that is in the first VPLS instance and that receives the first packet is the first port, the first VPWS instance that has a binding relationship with the first VPLS instance. For example, after receiving the first packet by using the first VPLS instance, the first network device determines that the port that is in the first VPLS instance and that receives the first packet is the first port of the first VPLS instance, and the first network device determines, based on the first port, the first VPWS instance that has a binding relationship with the first VPLS instance. The first port may be located on the first network device, and the first port may be connected to the first VPLS instance, or may be used by the first VPLS instance for packet forwarding. Therefore, the first port is described as the first port of the first VPLS instance. In an embodiment of the application, a port (for example, the first port) on the first network device may be bound to (or corresponding to) a VPWS instance (for example, the first VPWS instance) in the first network device, so that the first network device can determine, based on the first port that receives the first packet, the first VPWS instance that has a binding relationship with the first VPLS instance. A correspondence between a port on the first network device and a VPWS instance in the first network device may be preconfigured, or may be dynamically determined based on a mechanism. This is not limited in an embodiment of the application.

S403: The first network device forwards the first packet to a second VPWS instance in the second network device by using the first VPWS instance.

The second network device may be configured with at least one VPWS instance. The second VPWS instance is a VPWS instance in the second network device, and the first VPWS instance and the second VPWS instance are used to bear a same service. The first VPWS instance may correspond to the second VPWS instance. For example, as shown in FIG. 1 to FIG. 3, the first VPWS instance is VPWS instance 1 in PE 1, and the second VPWS instance is VPWS instance 1 in PE 2.

In an embodiment, the first network device may determine a routing and forwarding table of the first VPWS instance in the first network device, and forward the first packet to the second VPWS instance in the second network device through the first VPWS instance based on the routing and forwarding table of the first VPWS instance. For example, the first network device may determine the second VPWS instance in the second network device based on the routing and forwarding table of the first VPWS instance, determine an egress port of the first packet from ports of the first VPWS instance by searching the routing and forwarding table of the first VPWS instance, and forward the first packet to the second VPWS instance in the second network device through the egress port of the first packet in the first VPWS instance. The egress port of the first packet in the first VPWS instance corresponds to the second VPWS instance in the second network device.

The routing and forwarding table of the first VPWS instance in S403 may be an association forwarding table of the first VPWS instance, and the routing and forwarding table (that is, the association forwarding table) of the first VPWS instance may be used to record a correspondence between a port identifier and association indication information. The port identifier is used to indicate a port corresponding to corresponding association indication information in the first VPWS instance, and the association indication information is used to indicate a remote device (for example, the second network device) of the first network device to determine a VPWS instance (for example, the second VPWS instance) corresponding to the first VPWS instance. For example, the association indication information may be an identifier of a VPN service borne in a VPWS instance in the remote device, or the association indication information may be an identifier of the VPWS instance. For example, in an MPLS network, the association indication information may be a VPN service label. In an SRv6 network, the association indication information may be an SID of a VPN service. In a possible implementation, an identifier of a VPN service may be used as an identifier of a VPWS instance. The first network device may determine, in the routing and forwarding table of the first VPWS instance, association indication information of a VPWS instance corresponding to the first VPWS instance, and determine a port indicated by a port identifier that is in the routing and forwarding table of the first VPWS instance and that corresponds to the association indication information as the egress port of the first packet.

Figure 6:
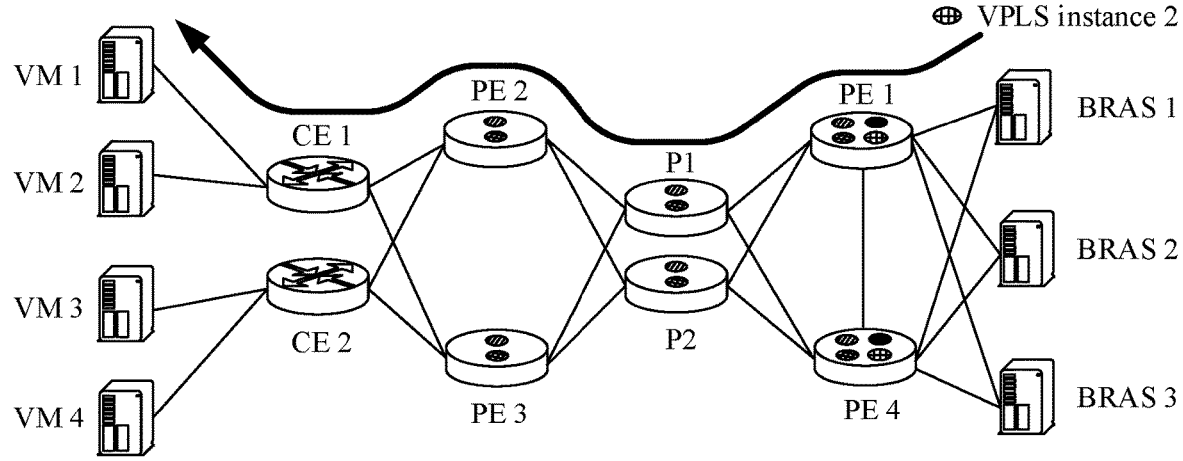
FIG. 6 is a schematic diagram of a packet transmission method according to an embodiment of the application.

For example, FIG. 6 is a schematic diagram of a packet transmission method according to an embodiment of the application. With reference to FIG. 6 and FIG. 5, the first network device may be PE 1, and the first VPLS instance is VPLS instance 1 in PE 1. PE 1 determines, from all VPWS instances of PE 1 based on a first port (for example, AC 11 in VPLS instance 1) that receives a first packet in VPLS instance 1 of PE 1, a first VPWS instance (for example, VPWS instance 1) bound to the first port, so as to determine that the first VPWS instance having a binding relationship with VPLS instance 1 is VPWS instance 1 in PE 1. The binding relationship between VPWS instance 1 and AC 11 in PE 1 may be preconfigured, or may be dynamically determined based on a mechanism. One VPWS instance may be associated with one or more VPLS instances. After determining VPWS instance 1 associated with VPLS instance 1, PE 1 determines a routing and forwarding table (that is, an association forwarding table) of VPWS instance 1 in PE 1, determines, based on the routing and forwarding table of VPWS instance 1 in PE 1, a port corresponding to VPWS instance 1 (that is, a second VPWS instance) in PE 2 as an egress port of the first packet, and forwards the first packet to VPWS instance 1 in PE 2 through the egress port of the first packet by using VPWS instance 1 in PE 1. As shown in FIG. 6, PE 1 first forwards the first packet to, for example, VPWS instance 1 in P1 through the egress port of the first packet by using VPWS instance 1 in PE 1, and after P1 receives the first packet, P1 forwards the first packet to VPWS instance 1 in PE 2 by using VPWS instance 1 in P1. The first packet may carry association indication information of VPWS instance 1, for example, an identifier of a VPN service, to indicate PE 2 to forward the first packet to a CE device by using VPWS instance 1 in PE 2.

In the foregoing example, PE 1 and PE 2 both bear VPWS instances 1. In an embodiment, content actually included in the corresponding VPWS instances borne in PE 1 and PE 2 is usually different due to localized implementation, but there is a correspondence between the VPWS instances because the VPWS instances bear a same service. For ease of understanding and description, the VPWS instances are both referred to as VPWS instance 1.

In conclusion, according to the packet transmission method provided in an embodiment of the application, the first network device is a device in the VPLS network, and the second network device is a device in the VPWS network. The first VPWS instance in the first network device and the second VPWS instance in the second network device are used to bear a same service, and the first VPLS instance in the first network device is associated with the first VPWS instance in the first network device. After receiving, by using the first VPLS instance, the first packet to be sent to the first user-side device connected to the second network device, the first network device determines the first VPWS instance based on the association relationship between the first VPLS instance and the first VPWS instance, and forwards the first packet to the second VPWS instance in the second network device by using the first VPWS instance. In this way, the first network device can forward the packet destined for the first user-side device without learning a MAC address of the first user-side device. This helps reduce pressure on the first network device to learn the MAC address, simplify a MAC entry of the first network device, and ensure packet forwarding performance of the network system. In addition, after receiving the first packet, the second network device may forward the first packet according to a VPWS forwarding mechanism by using the second VPWS instance in the second network device. The second network device can forward the packet to be sent to the first user-side device without learning the MAC address of the first user-side device. This helps reduce pressure on the second network device to learn the MAC address, and simplify a MAC entry of the second network device.

In an embodiment of the application, one VPWS instance in the first network device may be associated with one or more VPLS instances, different VPLS instances may be associated with different VPWS instances, and each VPLS instance can be associated with a VPWS instance through an AC port of the VPLS instance. The packet transmission method in the application may be further shown in FIG. 7.

Figure 7:
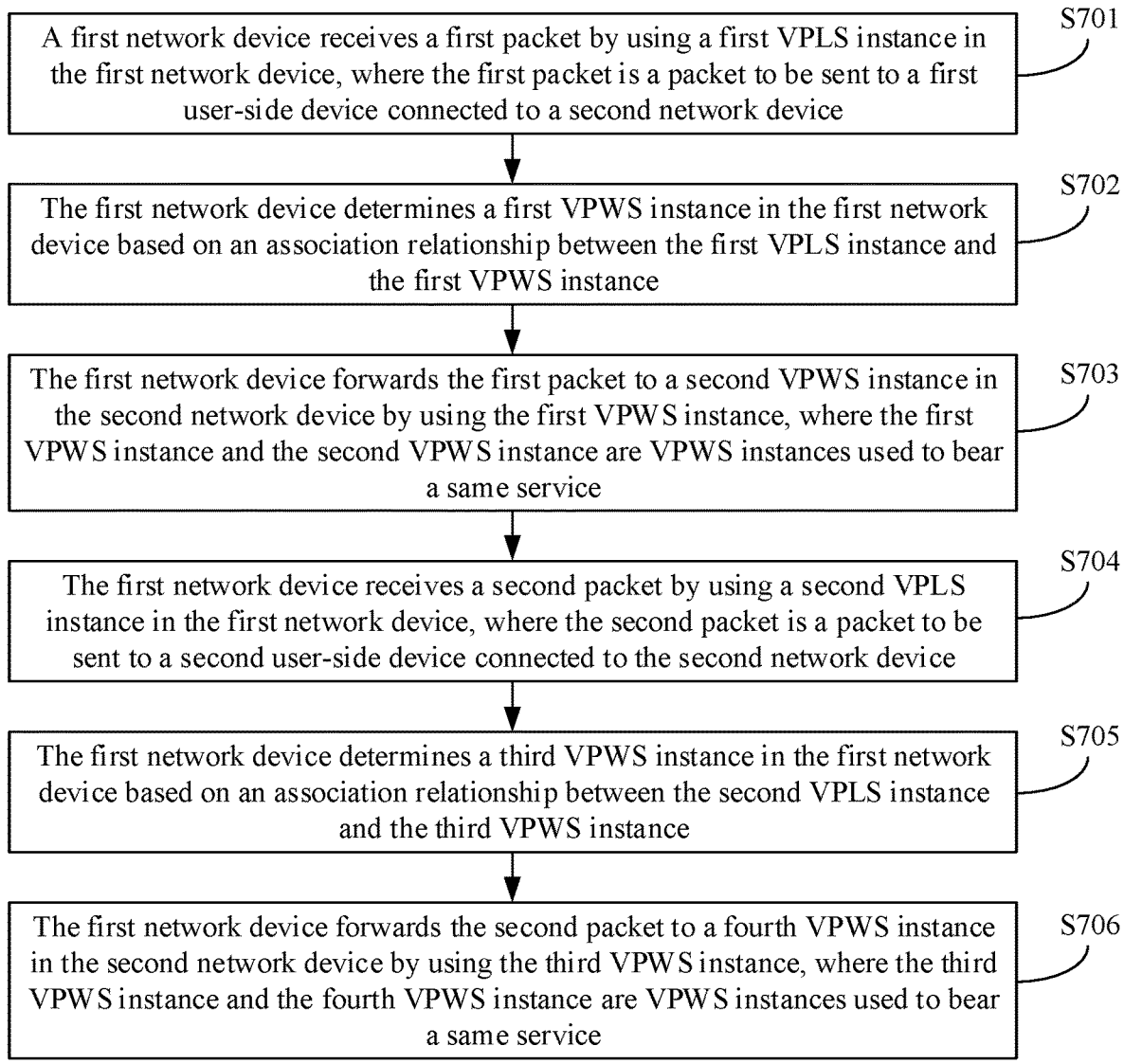
FIG. 7 is a flowchart of a packet transmission method according to another embodiment of the application.

For example, FIG. 7 is a flowchart of a packet transmission method according to another embodiment of the application. The packet transmission method may be applied to a system including a first network device and a second network device, the first network device is a device in a VPLS network, and the second network device is a device in a VPWS network. As shown in FIG. 7, the method may include the following operations.

S701: The first network device receives a first packet by using a first VPLS instance in the first network device, where the first packet is a packet to be sent to a first user-side device connected to the second network device.

S702: The first network device determines a first VPWS instance in the first network device based on an association relationship between the first VPLS instance and the first VPWS instance.

S703: The first network device forwards the first packet to a second VPWS instance in the second network device by using the first VPWS instance, where the first VPWS instance and the second VPWS instance are VPWS instances used to bear a same service.

For an implementation process of S701 to S703, refer to the embodiment shown in FIG. 4. Details are not described herein again.

S704: The first network device receives a second packet by using a second VPLS instance in the first network device, where the second packet is a packet to be sent to a second user-side device connected to the second network device.

The second packet may come from a broadband access device (for example, BRAS 1). The first network device may receive the second packet through a second port of the second VPLS instance in the first network device, where the second port may be a port in the second VPLS instance. For a schematic diagram of the second VPLS instance, refer to FIG. 5. Details are not described herein again.

S705: The first network device determines a third VPWS instance in the first network device based on an association relationship between the second VPLS instance and the third VPWS instance.

The first network device may be configured with at least one VPWS instance, and one VPWS instance in the first network device may be associated with one or more VPLS instances. The third VPWS instance is a VPWS instance in the first network device, the second VPLS instance in the first network device has an association relationship with the third VPWS instance, and the first network device may determine the third VPWS instance based on the association relationship between the second VPLS instance and the third VPWS instance.

In an embodiment, the association relationship is a binding relationship, the second port in the second VPLS instance may be bound to the third VPWS instance, and the first network device may determine, based on a fact that a port that is in the second VPLS instance and that receives the first packet is the second port, the third VPWS instance that has a binding relationship with the second VPLS instance.

S706: The first network device forwards the second packet to a fourth VPWS instance in the second network device by using the third VPWS instance, where the third VPWS instance and the fourth VPWS instance are VPWS instances used to bear a same service.

The fourth VPWS instance may be a VPWS instance in the second network device, the third VPWS instance in the first network device and the fourth VPWS instance are used to bear a same service, and the third VPWS instance may correspond to the fourth VPWS instance. In an embodiment, the first network device may determine a routing and forwarding table of the third VPWS instance in the first network device, and forward the second packet to the fourth VPWS instance in the second network device through the third VPWS instance based on the routing and forwarding table of the third VPWS instance. For example, the first network device may determine the fourth VPWS instance in the second network device based on the routing and forwarding table of the third VPWS instance, determine an egress port of the second packet from ports of the third VPWS instance by searching the routing and forwarding table of the third VPWS instance, and forward the second packet to the fourth VPWS instance in the second network device through the egress port of the second packet in the third VPWS instance. The egress port of the second packet in the third VPWS instance corresponds to the fourth VPWS instance in the second network device.

In the embodiments shown in FIG. 4 and FIG. 7, an example in which the first network device transmits a downstream packet (for example, a packet sent from a broadband access device to a user-side device) is used for description. The packet transmission method provided in the application may be further used to transmit an upstream packet (for example, a packet sent from a user-side device to a broadband access device). The following describes a process in which the first network device transmits an upstream packet.

Figure 8:
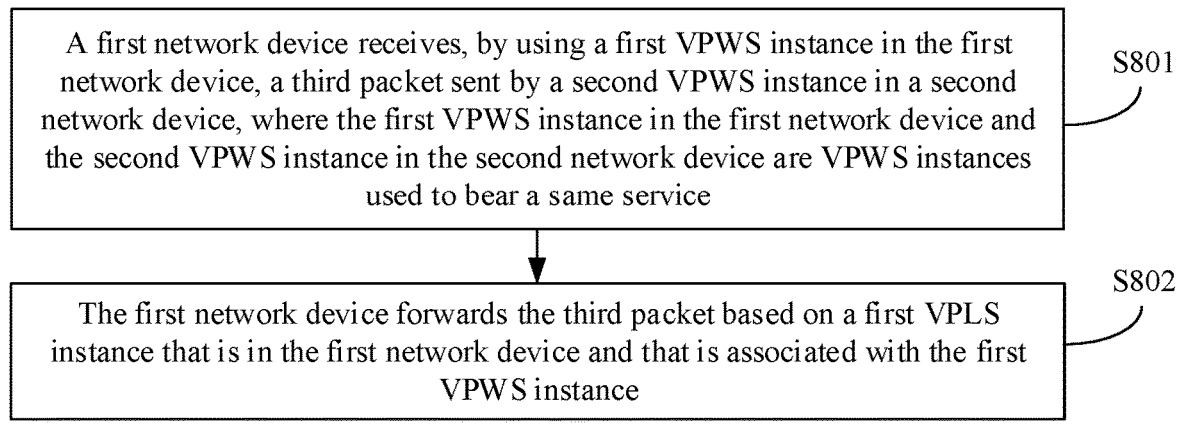
FIG. 8 is a flowchart of a packet transmission method according to another embodiment of the application.

For example, FIG. 8 is a flowchart of a packet transmission method according to another embodiment of the application. The packet transmission method may be applied to a system including a first network device and a second network device, the first network device is a device in a VPLS network, and the second network device is a device in a VPWS network. For example, as shown in FIG. 1 to FIG. 3, the first network device may be PE 1, and the second network device may be PE 2. As shown in FIG. 8, the method may include the following operations.

S801: The first network device receives, by using a first VPWS instance in the first network device, a third packet sent by a second VPWS instance in the second network device, where the first VPWS instance in the first network device and the second VPWS instance in the second network device are VPWS instances used to bear a same service.

In an embodiment, the first network device and the second network device each may be configured with at least one VPWS instance. The first VPWS instance is a VPWS instance in the first network device, and the second VPWS instance is a VPWS instance in the second network device. The first VPWS instance and the second VPWS instance are used to bear a same service, and the first VPWS instance may correspond to the second VPWS instance. The second network device may send the third packet to the first VPWS instance in the first network device by using the second VPWS instance in the second network device, and the first network device may receive the third packet by using the first VPWS instance in the first network device. The third packet may come from a user-side device. For example, as shown in FIG. 1 to FIG. 3, the first VPWS instance is VPWS instance 1 in PE 1, and the second VPWS instance is VPWS instance 1 in PE 2. The third packet may come from VM 1.

The following describes related content of a VPWS instance in the first network device.

In an embodiment, each VPWS instance in the first network device may include at least one port, each port has a type, and in the VPWS instance, a type of each port may be one of a virtual port type or an EVPN Peer type. A port of a virtual port type may be referred to as a virtual port, and a port of an EVPN Peer type may be referred to as an EVPN Peer port. The EVPN Peer port may be used by the first network device to communicate with a remote device (for example, a remote PE device). The virtual port is described below. Because the first VPWS instance is a VPWS instance in the first network device, a type of a port in the first VPWS instance may be one of a virtual port type or an EVPN Peer type. In an embodiment, the first VPWS instance includes a port of a virtual port type, and the first VPWS instance may further include a port of an EVPN Peer type, that is, the first VPWS instance may include a virtual port and an EVPN Peer port. For example, each VPWS instance in the first network device includes a virtual port and an EVPN Peer port, and the VPWS instance in the first network device may further include another type of port. This is not limited in an embodiment of the application.

In an embodiment, the first network device may be further configured with at least one VPLS instance. Each VPLS instance may include at least one port, and each port has a type. In the VPLS instance, a type of each port may be one of an EVPN Peer type or an AC type. A port of an AC type may be referred to as an AC port, and the AC port may be used by the first network device to communicate with a broadband access device (for example, a BRAS). A first VPLS instance may be a VPLS instance in the first network device, and a type of a port in the first VPLS instance may be one of an EVPN Peer type or an AC type. In an embodiment, the first VPLS instance includes at least one of a port of an AC type and a port of an EVPN Peer type. For example, the first VPLS instance includes a port of an AC type and a port of an EVPN Peer type (that is, the first VPLS instance includes an AC port and an EVPN Peer port). In an embodiment, each VPLS instance in the first network device includes an AC port and an EVPN Peer port, and the VPLS instance in the first network device may further include another type of port. This is not limited in an embodiment of the application. When the first VPLS instance includes a plurality of AC ports, the plurality of AC ports may be isolated from each other, so that broadband access devices corresponding to the plurality of AC ports are isolated from each other, and the broadband access devices corresponding to the plurality of AC ports do not access each other. For example, a switch may be configured in the first VPLS instance, and the plurality of AC ports included in the first VPLS instance are controlled to be isolated from each other by using the switch.

In an embodiment of the application, each VPWS instance in the first network device may be associated with (or bound to) at least one VPLS instance in the first network device, and each VPLS instance in the first network device may be associated with (or bound to) one VPWS instance in the first network device, so that interconnection between the VPWS instance and the VPLS instance is implemented in the first network device. In an embodiment, a virtual port of a VPWS instance in the first network device may indicate a VPLS instance in the first network device. In this indication manner, the VPLS instance in the first network device is associated with the VPWS instance in the first network device, so as to implement interconnection between the VPWS instance and the VPLS instance in the first network device. The following describes related content of association between the VPWS instance and the VPLS instance in the first network device by using an example in which the virtual port of the first VPWS instance in the first network device indicates a VPLS instance in the first network device.

In an embodiment, the virtual port of the first VPWS instance in the first network device may indicate the VPLS instance in the first network device, so that the first VPWS instance is associated with the VPLS instance in the first network device by using the virtual port in the first VPWS instance. The first VPWS instance may include one or more virtual ports. When the first VPWS instance includes a plurality of virtual ports, the plurality of virtual ports may indicate different VPLS instances in the first network device, so that the first VPWS instance is associated with a plurality of different VPLS instances in the first network device. When the first VPWS instance includes a plurality of virtual ports, the plurality of virtual ports may be isolated from each other, so that VPLS instances indicated by the plurality of virtual ports are isolated from each other, and broadband access devices corresponding to the VPLS instances indicated by the plurality of virtual ports do not access each other. For example, a switch may be configured in the first VPWS instance, and the plurality of virtual ports included in the first VPWS instance are controlled to be isolated from each other by using the switch. In an embodiment of the application, the VPLS instance indicated by the virtual port of the first VPWS instance is associated with the first VPWS instance due to the indication relationship, and the VPLS instance associated with the first VPWS instance may be in a one-to-one correspondence with the virtual port in the first VPWS instance. That is, each virtual port in the first VPWS instance may indicate one VPLS instance in the first network device, and one VPLS instance in the first network device may be indicated by one virtual port in the first VPWS instance. In an embodiment, the first VPWS instance may include a first virtual port, and the first virtual port may indicate the first VPLS instance in the first network device. The following describes an association relationship between a VPWS instance and VPLS instances with reference to FIG. 9.

Figure 9:
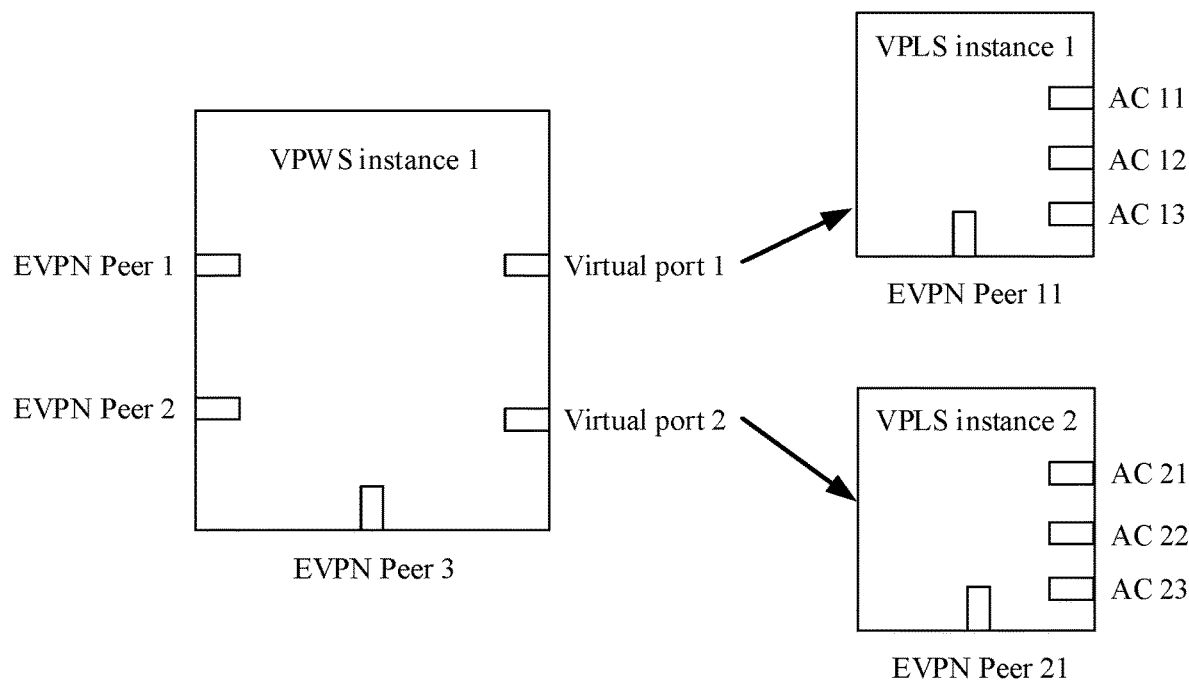
FIG. 9 is a schematic diagram of a relationship between a VPWS instance and VPLS instances according to an embodiment of the application.

For example, FIG. 9 shows a schematic diagram of a relationship between a VPWS instance and VPLS instances in the first network device (for example, PE 1 in FIG. 1 to FIG. 3) according to an embodiment of the application. As shown in FIG. 9, VPWS instance 1 (for example, the first VPWS instance) in the first network device includes three EVPN Peer ports: EVPN Peer 1, EVPN Peer 2, and EVPN Peer 3, and two virtual ports: virtual port 1 and virtual port 2. The first network device includes two VPLS instances, which are respectively VPLS instance 1 and VPLS instance 2. VPLS instance 1 includes one EVPN Peer port: EVPN Peer 11, and three AC ports: AC 11, AC 12, and AC 13. VPLS instance 2 includes one EVPN Peer port: EVPN Peer 21, and three AC ports: AC 21, AC 22, and AC 23. Virtual port 1 in VPWS instance 1 is used to indicate VPLS instance 1, virtual port 2 in VPWS instance 1 is used to indicate VPLS instance 2, and virtual port 1 and virtual port 2 may be isolated from each other. In VPLS instance 1, AC 11, AC 12, and AC 13 may be isolated from each other, and AC 11, AC 12, and AC 13 may be isolated from EVPN Peer 11. In VPLS instance 2, AC 21, AC 22, and AC 23 may be isolated from each other, and AC 21, AC 22, and AC 23 may be isolated from EVPN Peer 21. It may be determined, according to the relationship diagram shown in FIG. 9, that in the first network device, VPWS instance 1 is associated with both VPLS instance 1 and VPLS instance 2, VPLS instance 1 may be associated with only VPWS instance 1, and VPLS instance 2 may be associated with only VPWS instance 1. This is not limited in an embodiment of the application.

In an embodiment, an EVPN Peer port in a VPLS instance in the first network device may be a protection port. The protection port may be used for communication between the VPLS instance in the first network device and a VPLS instance in a protection device (for example, a remote device that performs forwarding protection) of the first network device. For example, in the VPLS instance, the protection port may be a backup port for one or several ports in the VPLS instance (for ease of description, the one or several ports are referred to as main ports). When the main port is in an unavailable state (for example, a DOWN state), the first network device may forward, through the protection port to the VPLS instance in the protection device of the first network device, a packet that should have been forwarded through the main port. The VPLS instance in the protection device subsequently forwards the packet. Similarly, an EVPN Peer port in a VPWS instance in the first network device may be a protection port. The protection port may be used for communication between the VPWS instance in the first network device and a VPWS instance in the protection device of the first network device. For example, in the VPWS instance, the protection port may be a backup port for one or several ports in the VPWS instance (for ease of description, the one or several ports are referred to as main ports). When the main port is in an unavailable state, the first network device may forward, through the protection port to the VPWS instance in the protection device of the first network device, a packet that should have been forwarded through the main port. The VPWS instance in the protection device subsequently forwards the packet.

Figure 10:
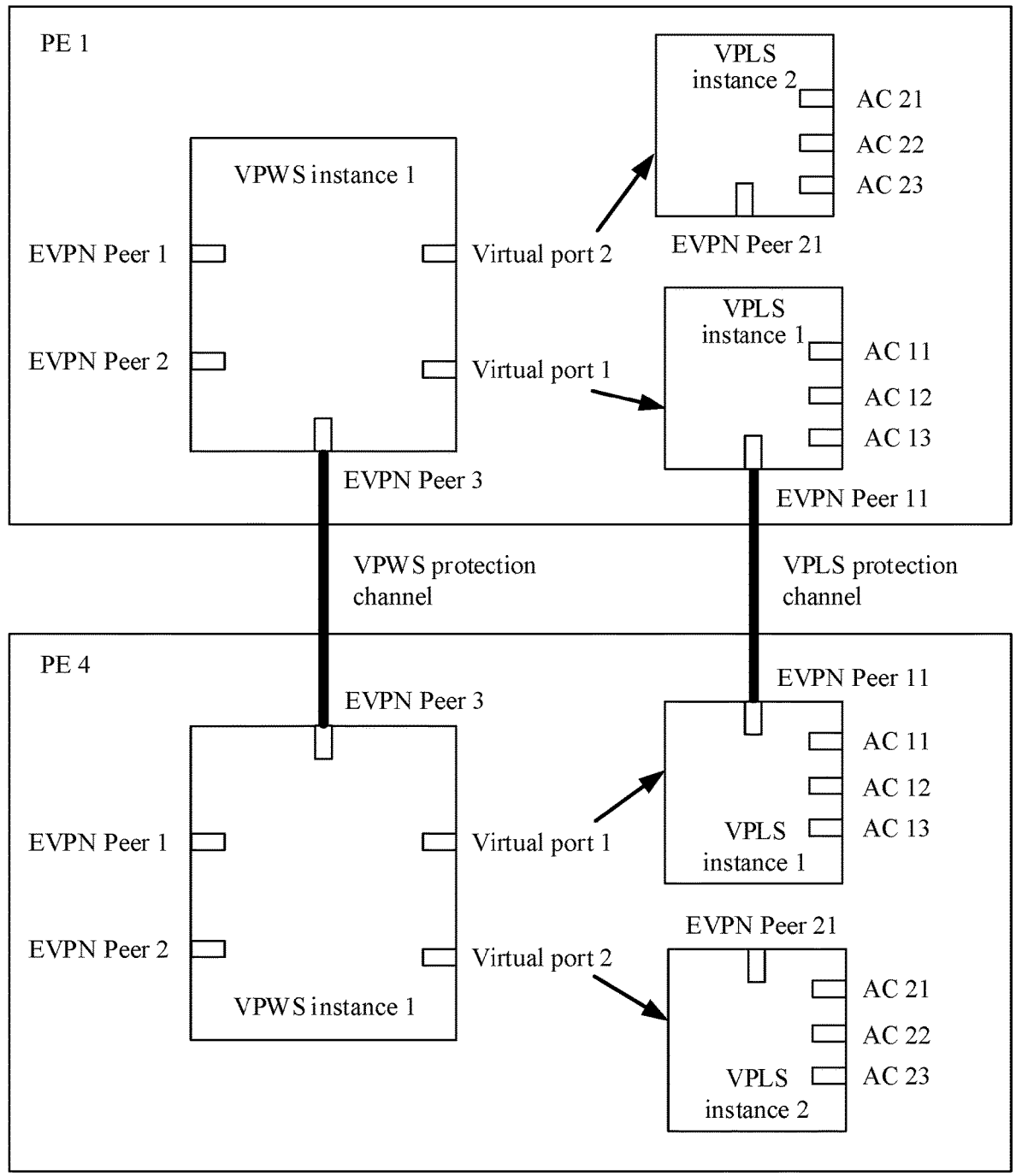
FIG. 10 is a schematic diagram of a relationship between PE 1 and PE 4 according to an embodiment of the application.

For example, as shown in FIG. 9, EVPN Peer 3 in VPWS instance 1 may be a protection port of VPWS instance 1, EVPN Peer 11 in VPLS instance 1 may be a protection port of VPLS instance 1, and EVPN Peer 21 in VPLS instance 2 may be a protection port of VPLS instance 2. As shown in FIG. 2 and FIG. 3, PE 4 may be a protection device for PE 1. FIG. 10 is a schematic diagram of a relationship between PE 1 and PE 4 according to an embodiment of the application. For content of the VPWS instance and the VPLS instances in PE 4, refer to related descriptions in FIG. 9. Details are not described herein again. This part mainly describes the relationship between PE 1 and PE 4. As shown in FIG. 10, EVPN Peer 11 (protection port) of VPLS instance 1 in PE 1 and EVPN Peer 11 (protection port) of VPLS instance 1 in PE 4 are connected, to form a VPLS protection channel between the protection ports. EVPN Peer 3 (protection port) of VPWS instance 1 in PE 1 and EVPN Peer 3 (protection port) of VPWS instance 1 in PE 4 are connected, to form a VPWS protection channel between the protection ports. In VPLS instance 1 of PE 1, EVPN Peer 11 may be a backup port for AC 11 to AC 13, and when a port (for example, AC 11) in AC 11 to AC 13 is in an unavailable state, PE 1 may forward, through EVPN Peer 11 to VPLS instance 1 in PE 4, a packet that should have been forwarded through AC 11, and VPLS instance 1 in PE 4 subsequently forwards the packet. Similarly, in VPWS instance 1 of PE 1, EVPN Peer 3 may be a backup port for virtual port 1 and virtual port 2. When a port (for example, virtual port 1) in virtual port 1 and virtual port 2 is in an unavailable state, PE 1 may forward, through EVPN Peer 3 to VPWS instance 1 in PE 4, a packet that should have been forwarded by using VPLS instance 1 indicated by virtual port 1, and VPWS instance 1 in PE 4 subsequently forwards the packet.

In an embodiment of the application, the protection port in the VPLS instance and the protection port in the VPWS instance may be ports that play a protection role in an upstream forwarding process, and the protection ports may not be used for forwarding protection in a downstream forwarding process. This is not limited in an embodiment of the application. For example, as shown in FIG. 9 and FIG. 10, for VPLS instance 1 in PE 1, when traffic (upstream traffic) that should have been forwarded through a port (for example, AC 11) in AC 11 to AC 13 cannot be forwarded through AC 11 because AC 11 is in an unavailable state, PE 1 may forward the traffic through EVPN Peer 11. Traffic (downstream traffic) that enters VPLS instance 1 through AC 11 to AC 13 may not be forwarded through EVPN Peer 11. For VPWS instance 1 in PE 1, when traffic (upstream traffic) that should have been forwarded based on a port (for example, virtual port 1) in virtual port 1 and virtual port 2 cannot be forwarded because virtual port 1 is in an unavailable state, PE 1 may forward the traffic through EVPN Peer 3. Traffic (downstream traffic) that enters VPWS instance 1 through virtual port 1 and virtual port 2 may not be forwarded through EVPN Peer 3. A case of VPLS instance 2 is the same as that of VPLS instance 1, and details are not described herein.

S802: The first network device forwards the third packet based on the first VPLS instance that is in the first network device and that is associated with the first VPWS instance.

In an embodiment, the first network device parses the third packet, to determine, from the third packet, a destination address carried in the third packet, and then determines, in the first VPWS instance of the first network device based on the destination address carried in the third packet, the first virtual port corresponding to the destination address. The first virtual port may be used to indicate the first VPLS instance in the first network device. Then, the first network device forwards the third packet based on the first virtual port, so as to implement the forwarding, by the first network device, the third packet based on the first VPLS instance associated with the first VPWS instance.

In an embodiment, the destination address carried in the third packet may be a broadcast address or a unicast address. For example, the third packet may be a packet sent by a user-side device (for example, VM 1) when the user-side device requests to access a broadband access device. In this case, the destination address carried in the third packet may be a broadcast address. For another example, the third packet may be a packet that is sent by the user-side device after the user-side device accesses a broadband access device (for example, BRAS 1) and that is used to obtain data from the broadband access device. In this case, the destination address carried in the third packet may be a unicast address. If the destination address carried in the third packet is a broadcast address, the first network device may determine, in the first VPWS instance based on the destination address carried in the third packet, one or more virtual ports corresponding to the destination address, where the one or more virtual ports include the first virtual port. If the destination address carried in the third packet is a unicast address, the first network device may determine, in the first VPWS instance based on the destination address carried in the third packet, a virtual port corresponding to the destination address, where the virtual port is the first virtual port.

The following describes an implementation process in which the first network device determines, in the first VPWS instance of the first network device based on the destination address carried in the third packet, the first virtual port corresponding to the destination address in S802. The implementation process is applicable to a case in which the destination address is a broadcast address or a unicast address.

In an embodiment, the first network device may maintain a routing and forwarding table of the first VPWS instance of the first network device, and the first network device may determine the first virtual port corresponding to the destination address based on a fact that a port corresponding to the destination address carried in the third packet is a virtual port in the routing and forwarding table of the first VPWS instance. That is, the first network device determines, from the ports of the first VPWS instance based on the routing and forwarding table of the first VPWS instance, the first virtual port corresponding to the destination address carried in the third packet. The routing and forwarding table of the first VPWS instance herein may be a MAC forwarding table of the first VPWS instance, and the routing and forwarding table of the first VPWS instance may record a correspondence between an address (for example, a MAC address) and a port identifier. In the routing and forwarding table of the first VPWS instance, the port identifier may be used to indicate a port corresponding to a corresponding address in the first VPWS instance and a type of the port, or the port identifier is used to indicate only a port corresponding to a corresponding address in the first VPWS instance. In an embodiment, the routing and forwarding table of the first VPWS instance may include at least two port identifiers corresponding to a same address to indicate at least two ports, and the at least two ports may include a main port and a backup port that are corresponding to the address. In an embodiment, when one address corresponds to at least two port identifiers, the routing and forwarding table of the first VPWS instance may further record main/backup identification information corresponding to the at least two port identifiers, to identify a main port or a backup port in the at least two ports indicated by the at least two port identifiers. For example, the routing and forwarding table of the first VPWS instance further includes a main/backup information identification column, and main/backup identification information used to identify a main port or a backup port may be located in the main/backup identification information column. In an embodiment, in a case in which one address is corresponding to one port identifier, a corresponding entry in the main/backup identification information column in the routing and forwarding table of the first VPWS instance may be null, or identification information in the corresponding entry in the main/backup identification information column identifies that a corresponding port is a main port. This is not limited in an embodiment of the application.

Because a port identifier may indicate different content (the port identifier indicates only a port or indicates the port and a type of the port), the routing and forwarding table of the first VPWS instance may be implemented in two possible manners. Correspondingly, that the first network device determines, based on the routing and forwarding table of the first VPWS instance, the first virtual port corresponding to the destination address carried in the third packet may have two possible implementations. The following describes, in two possible implementations based on different content indicated by the port identifier and with reference to content of main and backup ports, the routing and forwarding table of the first VPWS instance and an implementation process in which the first network device determines, based on the routing and forwarding table of the first VPWS instance, the first virtual port corresponding to the destination address carried in the third packet.

First implementation: The routing and forwarding table of the first VPWS instance records a correspondence between an address and a port identifier, and the port identifier is used to indicate a port corresponding to a corresponding address in the first VPWS instance and a type of the port. In an embodiment, each type of port corresponds to a different type of port identifier, and each type of port identifier may indicate one type of port, so that in the routing and forwarding table of the first VPWS instance, the port identifier may be used to indicate a port and a type of the port. If one address corresponds to at least two port identifiers, the routing and forwarding table of the first VPWS instance may further record main/backup identification information corresponding to the at least two port identifiers. The first network device may determine, from the routing and forwarding table of the first VPWS instance, an address that matches (for example, is the same as) the destination address carried in the third packet, and determine a port identifier corresponding to the address that matches the destination address. If the routing and forwarding table of the first VPWS instance includes a port identifier corresponding to the address matching the destination address, the first network device determines a virtual port indicated by the port identifier as the first virtual port corresponding to the destination address carried in the third packet. If the routing and forwarding table of the first VPWS instance includes at least two port identifiers corresponding to the address matching the destination address, the first network device determines, based on the at least two port identifiers with reference to main/backup identification information corresponding to the at least two port identifiers that is recorded in the routing and forwarding table of the first VPWS instance, the first virtual port corresponding to the destination address carried in the third packet.

For example, the routing and forwarding table of the first VPWS instance may be shown in Table 1. In Table 1, an example in which an address in the routing and forwarding table of the first VPWS instance is a MAC address is used for description. Content in each row in Table 1 may be one forwarding entry. It may be understood that the routing and forwarding table shown in the following Table 1 is a MAC forwarding table of the first VPWS instance.

TABLE 1

| Address | Port identifier | Main/backup identification information |
|---|---|---|
| MAC address 1 | V-P1 | Main port |
| MAC address 1 | EVPN Peer-P3 | Backup port |
| MAC address 2 | V-P2 | Main port |
| MAC address 2 | EVPN Peer-P3 | Backup port |

As shown in Table 1, the routing and forwarding table of the first VPWS instance records MAC address 1 and MAC address 2, and port identifiers corresponding to the MAC addresses. With reference to FIG. 9, the port identifiers V-P1 and V-P2 may sequentially indicate virtual port 1 and virtual port 2, and the port identifier EVPN Peer-P3 may indicate EVPN Peer 3. MAC address 1 and MAC address 2 each correspond to two port identifiers. Therefore, the routing and forwarding table of the first VPWS instance further records main/backup identification information corresponding to the two port identifiers. In the two port identifiers corresponding to MAC address 1, main/backup identification information corresponding to the port identifier V-P1 is "Main port", and main/backup identification information corresponding to the port identifier EVPN Peer-P3 is "Backup port". In this case, virtual port 1 indicated by the port identifier V-P1 is the main port corresponding to MAC address 1, and EVPN Peer 3 indicated by the port identifier EVPN Peer-P3 is the backup port corresponding to MAC address 1. A case of MAC address 2 is similar to that of MAC address 1, and details are not described herein again.

It is assumed that the first network device determines, from the routing and forwarding table shown in Table 1, that the address matching the destination address carried in the third packet is MAC address 1. It can be learned from Table 1 that: Port identifiers corresponding to MAC address 1 in the routing and forwarding table are V-P1 and EVPN Peer-P3, and because main/backup identification information corresponding to the port identifier V-P1 is "Main port", and main/backup identification information corresponding to the port identifier EVPN Peer-P3 is "Backup port", the first network device determines that virtual port 1 indicated by the port identifier V-P1 is the first virtual port corresponding to the destination address carried in the third packet.

Second implementation: The routing and forwarding table of the first VPWS instance records a correspondence between an address and a port identifier, and the port identifier is used to indicate a port corresponding to a corresponding address in the first VPWS instance. In this case, the routing and forwarding table of the first VPWS instance may further record a port type, and the port type is used to indicate a type of a port indicated by a corresponding port identifier. That is, in the second implementation, the routing and forwarding table of the first VPWS instance may record a correspondence between an address, a port identifier, and a port type. If one address corresponds to at least two port identifiers, the routing and forwarding table of the first VPWS instance may further record main/backup identification information corresponding to the at least two port identifiers. The first network device may determine, from the routing and forwarding table of the first VPWS instance, an address that matches (for example, is the same as) the destination address carried in the third packet, and determine a port identifier corresponding to the address that matches the destination address. If the routing and forwarding table of the first VPWS instance includes one port identifier corresponding to the address matching the destination address, the first network device determines a virtual port indicated by the port identifier as the first virtual port corresponding to the destination address carried in the third packet. If the routing and forwarding table of the first VPWS instance includes at least two port identifiers corresponding to the address matching the destination address, the first network device determines, based on the at least two port identifiers with reference to main/backup identification information corresponding to the at least two port identifiers that is recorded in the routing and forwarding table of the first VPWS instance, the first virtual port corresponding to the destination address carried in the third packet.

For example, the routing and forwarding table of the first VPWS instance may be shown in Table 2. In Table 2, an example in which an address in the routing and forwarding table of the first VPWS instance is a MAC address is used for description. Content in each row in Table 2 may be one forwarding entry. It may be understood that the routing and forwarding table shown in the following Table 2 is a MAC forwarding table of the first VPWS instance.

TABLE 2

| Address | Port identifier | Port type | Main/backup identification information |
|---|---|---|---|
| MAC address 1 | P1 | Virtual port type | Main port |
| MAC address 1 | P3 | EVPN Peer type | Backup port |
| MAC address 2 | P2 | Virtual port type | Main port |
| MAC address 2 | P3 | EVPN Peer type | Backup port |

As shown in Table 2, the routing and forwarding table of the first VPWS instance records MAC address 1 and MAC address 2, and port identifiers corresponding to the MAC addresses. The port identifiers P1 to P3 may sequentially indicate port 1 to port 3 in the first VPWS instance, types of the ports indicated by the port identifiers P1 and P2 are both virtual port types, and a type of the port indicated by the port identifier P3 is an EVPN Peer type. For example, with reference to FIG. 9, the port identifiers P1 and P2 sequentially indicate virtual port 1 and virtual port 2, and the port identifier P3 indicates EVPN Peer 3. MAC address 1 and MAC address 2 each correspond to two port identifiers. Therefore, the routing and forwarding table of the first VPWS instance further records main/backup identification information corresponding to the two port identifiers. In the two port identifiers corresponding to MAC address 1, main/backup identification information corresponding to the port identifier P1 is "Main port", and main/backup identification information corresponding to the port identifier P3 is "Backup port". In this case, virtual port 1 indicated by the port identifier P1 is the main port corresponding to MAC address 1, and EVPN Peer 3 indicated by the port identifier P3 is the backup port corresponding to MAC address 1.

It is assumed that the first network device determines, from the routing and forwarding table of the first VPWS instance shown in Table 2, that the address matching the destination address carried in the third packet is MAC address 1. It can be learned from Table 2 that: Port identifiers corresponding to MAC address 1 in the routing and forwarding table of the first VPWS instance are P1 and P3, and because main/backup identification information corresponding to the port identifier P1 is "Main port", and main/backup identification information corresponding to the port identifier P3 is "Backup port", the first network device determines that virtual port 1 indicated by the port identifier P1 is the first virtual port corresponding to the destination address carried in the third packet.

The foregoing description of an embodiment of the application uses an example in which the destination address carried in the third packet hits two forwarding entries in the routing and forwarding table of the first VPWS instance, and the destination address is a unicast address (the first network device determines the first virtual port corresponding to the destination address based on one of the two forwarding entries). In an embodiment, if the destination address carried in the third packet hits at least two forwarding entries in the routing and forwarding table of the first VPWS instance, and the destination address carried in the third packet is a broadcast address, the first network device may broadcast the third packet based on the at least two forwarding entries.

In the foregoing example in an embodiment of the application, the forwarding entry corresponding to the main port may be referred to as a main forwarding entry, and the forwarding entry corresponding to the backup port may be referred to as a backup forwarding entry. In the foregoing example, the first network device determines, based on the main forwarding entry, the first virtual port corresponding to the destination address carried in the third packet. In a possible implementation, if the main forwarding entry is unavailable, the first network device may determine, based on the backup forwarding entry, a virtual port corresponding to the destination address carried in the third packet (if such a backup forwarding entry exists). That the main forwarding entry is unavailable includes but is not limited to: A port indicated by a port identifier in the main forwarding entry is faulty (for example, a VPLS instance indicated by the virtual port is faulty); or another device or a port connected to the port indicated by the port identifier in the main forwarding entry is faulty; or the like. This is not limited in an embodiment of the application. In Table 1 and Table 2, an example in which different port identifiers corresponding to a same MAC address are located in different forwarding entries is used for description. In actual application, different port identifiers corresponding to a same MAC address may be located in a same forwarding entry corresponding to the MAC address, and a main/backup relationship may be determined by using corresponding identification information. A form of the forwarding entry in the routing and forwarding table of the VPWS instance is not limited in an embodiment of the application. In an embodiment, if the destination address carried in the third packet hits at least two forwarding entries in the routing and forwarding table of the first VPWS instance, the first network device may further determine, based on priorities, the first virtual port corresponding to the destination address carried in the third packet. Details are not described herein again in an embodiment of the application.

It should be noted that, in an embodiment of the application, the virtual port included in the VPWS instance may actually be understood as identification information that is stored in the VPWS instance and used to indicate a VPLS instance. In a possible natural implementation, the identification information may be stored in a routing and forwarding table of the VPWS instance, and is placed in a port information column of the routing and forwarding table of the VPWS instance together with a port such as an EVPN peer port, so that the first network device searches the routing and forwarding table of the VPWS instance based on a destination address carried in a packet received by the VPWS instance, to determine whether the packet needs to be forwarded through the EVPN peer port of the VPWS instance or forwarded through the VPLS instance identified by the virtual port. Therefore, the identification information of the VPLS instance is referred to as a virtual port herein for ease of understanding. However, in other possible implementations, the identification information of the VPLS instance that is referred to as the virtual port may alternatively be stored in another possible location of the VPWS instance, and may be obtained by the VPWS instance in a feasible manner, to determine the VPLS instance associated with the VPWS instance. For example, the identification information of the VPLS instance that is referred to as a virtual port may alternatively be stored in another list independent of the routing and forwarding table of the VPWS instance, and information in the another list is associated with the port information column of the routing and forwarding table of the VPWS instance, to indicate that the information in the another list and information in the port information column of the routing and forwarding table are of a same or similar nature. The identification information of the VPLS instance and the virtual port may be considered to be equivalent concepts in a possible application scenario of the application.

The foregoing is the implementation process in which the first network device determines the first virtual port corresponding to the destination address carried in the third packet in S802. The following describes an implementation process in which the first network device forwards the third packet based on the first virtual port in S802.

In an embodiment, the first network device determines, based on the first virtual port corresponding to the destination address carried in the third packet, a routing and forwarding table of the first VPLS instance indicated by the first virtual port, and forwards the third packet based on the routing and forwarding table of the first VPLS instance. The routing and forwarding table of the first VPLS instance may be a MAC forwarding table, and the routing and forwarding table of the first VPLS instance may record a correspondence between an address (for example, a MAC address) and a port identifier. The port identifier is used to indicate a port corresponding to a corresponding address in the first VPLS instance. In an embodiment, the routing and forwarding table of the first VPLS instance may include at least two port identifiers corresponding to a same address to indicate at least two ports, and the at least two ports may include a main port and a backup port that are corresponding to the address. In an embodiment, when one address corresponds to at least two port identifiers, the routing and forwarding table of the first VPLS instance may further record main/backup identification information corresponding to the at least two port identifiers, to identify a main port or a backup port in the at least two ports indicated by the at least two port identifiers. For example, the routing and forwarding table of the first VPLS instance further includes a main/backup information identification column, and main/backup identification information used to identify a main port or a backup port may be located in the main/backup identification information column. In an embodiment, in a case in which one address is corresponding to one port identifier, a corresponding entry in the main/backup identification information column in the routing and forwarding table of the first VPLS instance may be null, or identification information in the corresponding entry in the main/backup identification information column identifies that a corresponding port is a main port. This is not limited in an embodiment of the application.

For example, the routing and forwarding table of the first VPLS instance may be shown in Table 3. In Table 3, an example in which an address in the routing and forwarding table of the first VPLS instance is a MAC address is used for description. Content in each row in Table 3 may be one forwarding entry. It may be understood that the routing and forwarding table shown in the following Table 3 is a MAC forwarding table of the first VPLS instance.

TABLE 3

| Address | Port identifier | Main/backup identification information |
|---|---|---|
| MAC address 1 | P11 | Main port |
| MAC address 1 | P14 | Backup port |
| MAC address 3 | P12 | Main port |

TABLE 3-continued

| Address | Port identifier | Main/backup identification information |
|---|---|---|
| MAC address 3 | P14 | Backup port |
| MAC address 4 | P13 | Main port |
| MAC address 4 | P14 | Backup port |

As shown in Table 3, the routing and forwarding table of the first VPLS instance records MAC address 1, MAC address 3, MAC address 4, and port identifiers corresponding to the MAC addresses. With reference to FIG. 9, the first VPLS instance may be VPLS instance 1, the port identifiers P11 to P13 may sequentially indicate AC 11 to AC 13, and the port identifier P14 may indicate EVPN Peer 11. MAC address 1, MAC address 3, and MAC address 4 each correspond to two port identifiers. Therefore, the routing and forwarding table of the first VPLS instance further records main/backup identification information corresponding to the two port identifiers. In the two port identifiers corresponding to MAC address 1, main/backup identification information corresponding to the port identifier P11 is "Main port", and main/backup identification information corresponding to the port identifier P14 is "Backup port". In this case, AC 11 indicated by the port identifier P11 is the main port corresponding to MAC address 1, and EVPN Peer 11 indicated by the port identifier P14 is the backup port corresponding to MAC address 1. Cases of MAC address 3 and MAC address 4 are similar to that of MAC address 1, and details are not described herein again.

In an embodiment, that the first network device forwards the third packet based on the routing and forwarding table of the first VPLS instance indicated by the first virtual port corresponding to the destination address carried in the third packet may include: The first network device determines, based on the routing and forwarding table of the first VPLS instance and the destination address carried in the third packet, a first egress port of the third packet in the first VPLS instance, and the first network device forwards the third packet through the first egress port of the third packet based on a fact that the first egress port of the third packet in the first VPLS instance is in an available state. The first network device may search the routing and forwarding table of the first VPLS instance based on the destination address carried in the third packet, to determine, from the routing and forwarding table of the first VPLS instance, an address that matches (for example, is the same as) the destination address carried in the third packet, and determine a port identifier corresponding to the address matching the destination address. If the routing and forwarding table of the first VPLS instance includes one port identifier corresponding to the address matching the destination address, the first network device determines a port indicated by the port identifier as the first egress port of the third packet. If the routing and forwarding table of the first VPLS instance includes at least two port identifiers corresponding to the address matching the destination address, the first network device determines, based on the at least two port identifiers with reference to main/backup identification information corresponding to the at least two port identifiers, a main port in at least two ports indicated by the at least two port identifiers as the first egress port of the third packet. Then, the first network device may detect whether the first egress port is in an available state, and if the first egress port is in an available state, the first network device forwards the third packet through the first egress port.

In an embodiment, the packet transmission system provided in an embodiment of the application further includes a third network device, the third network device is a device in the VPLS network, and the third network device may be a protection device for the first network device. For example, as shown in FIG. 2 and FIG. 3, the first network device may be PE 1, and the third network device may be PE 4. A relationship between PE 1 and PE 4 may be shown in FIG. 10. When the packet transmission system includes the third network device, that the first network device forwards the third packet based on the routing and forwarding table of the first VPLS instance indicated by the first virtual port corresponding to the destination address carried in the third packet may further include: The first network device forwards the third packet to a third VPLS instance in the third network device through the first VPLS instance based on a fact that the first egress port of the third packet in the first VPLS instance is in an unavailable state. The first VPLS instance in the first network device and the third VPLS instance in the third network device may be used to bear a same service. In an embodiment, the routing and forwarding table of the first VPLS instance includes at least two port identifiers corresponding to the address that matches the destination address carried in the third packet, the at least two port identifiers indicate at least two ports in the first VPLS instance, and the at least two ports may include a main port and a backup port. The backup port can be used to communicate with the third VPLS instance in the third network device. If the first network device determines that the first egress port of the third packet is in an unavailable state, the first network device may forward the third packet to the third VPLS instance through the backup port in the first VPLS instance. After the third packet arrives at the third VPLS instance in the third network device, the third network device may forward the third packet based on a routing and forwarding table of the third VPLS instance.

In an embodiment, when the packet transmission system includes the third network device, that the first network device forwards the third packet based on the routing and forwarding table of the first VPLS instance indicated by the first virtual port corresponding to the destination address carried in the third packet may further include: The first network device determines, based on the routing and forwarding table of the first VPLS instance, that all ports of the first VPLS instance are in an unavailable state, and the first network device forwards, based on the fact that all the ports of the first VPLS instance are in an unavailable state, the third packet to a fifth VPWS instance in the third network device by using the first VPWS instance in the first network device. The first VPWS instance in the first network device and the fifth VPWS instance in the third network device may be used to bear a same service. That all the ports of the first VPLS instance are in an unavailable state may be considered as: The first virtual port is in an unavailable state. In an embodiment, the routing and forwarding table of the first VPWS instance includes at least two port identifiers corresponding to the address that matches the destination address carried in the third packet, the at least two port identifiers indicate at least two ports in the first VPWS instance, and the at least two ports include a main port and a backup port. The backup port can be used to communicate with the fifth VPWS instance in the third network device. If the first network device determines that all the ports in the first VPLS instance are in an unavailable state, the first network device may forward the third packet to the fifth VPWS instance in the third network device through the backup port in the first VPWS instance. In an embodiment, the routing and forwarding table of the first VPLS instance includes at least two port identifiers corresponding to the address that matches the destination address carried in the third packet, and if ports indicated by the at least two port identifiers are in an unavailable state, the first network device may forward the third packet to the fifth VPWS instance by using the first VPWS instance. This is not limited in an embodiment of the application. After the third packet arrives at the fifth VPWS instance in the third network device, the third network device may forward the third packet based on a routing and forwarding table of the fifth VPWS instance.

Figure 11:
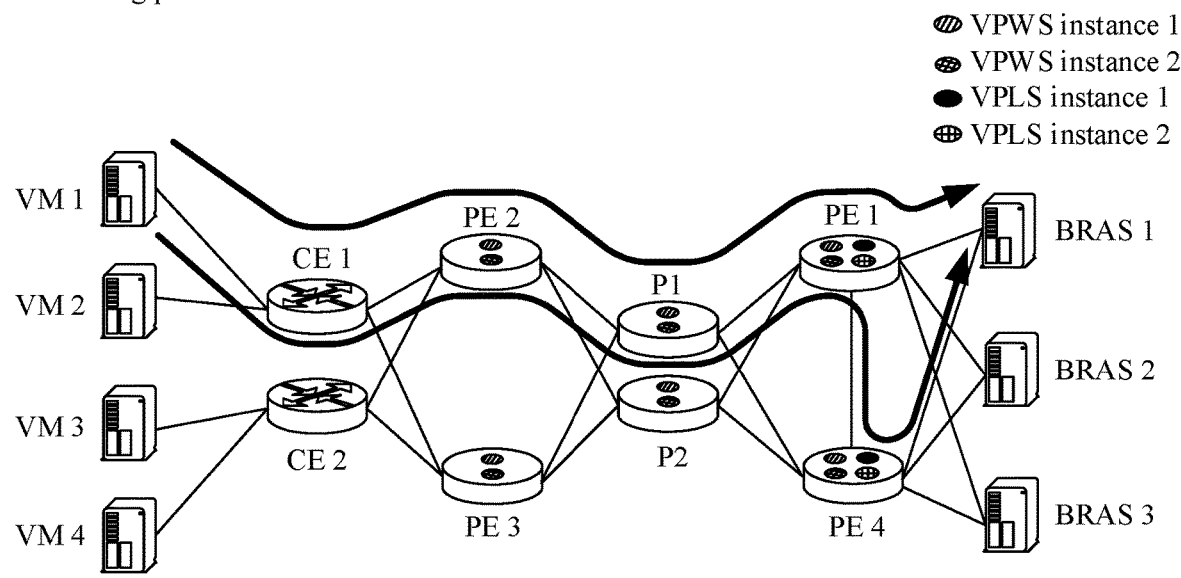
FIG. 11 is a schematic diagram of a packet transmission method according to another embodiment of the application.

For example, FIG. 11 is a schematic diagram of a packet transmission method according to another embodiment of the application. The first network device may be PE 1, the third network device may be PE 4, the first VPLS instance may be VPLS instance 1 in PE 1, the third VPLS instance may be VPLS instance 1 in PE 4, the first VPWS instance is VPWS instance 1 in PE 1, and the fifth VPWS instance is VPWS instance 1 in PE 4. The routing and forwarding table of the first VPLS instance is shown in Table 3, and the routing and forwarding table of the first VPWS instance is shown in Table 1 or Table 2. Refer to FIG. 10 and FIG. 11. It is assumed that the first network device determines, from the routing and forwarding table (Table 3) of the first VPLS instance, that the address matching the destination address carried in the third packet is MAC address 1. It can be learned from Table 3 that: Port identifiers corresponding to MAC address 1 in the routing and forwarding table of the first VPLS instance are P11 and P14, and because main/backup identification information corresponding to the port identifier P11 is "Main port", and main/backup identification information corresponding to the port identifier P14 is "Backup port", the first network device determines that AC 11 indicated by the port identifier P11 is the first egress port of the third packet. If AC 11 is in an available state, the first network device (that is, PE 1) forwards the third packet through AC 11. Finally, the third packet may arrive at BRAS 1 through the forwarding path S2 shown in FIG. 11. If AC 11 is in an unavailable state, the forwarding path S2 is faulty, and the first network device (that is, PE 1) may forward the third packet to the third VPLS instance (that is, VPLS instance 1 in PE 4) in the third network device (that is, PE 4) through EVPN Peer 11 indicated by the port identifier P14 in the first VPLS instance (that is, VPLS instance 1 in PE 1) of the first network device (that is, VPLS instance 1 in PE 1 forwards the third packet to VPLS instance 1 in PE 4 through a VPLS protection channel between VPLS instance 1 in PE 1 and VPLS instance 1 in PE 4), and finally, the third packet may arrive at BRAS 1 through the forwarding path S3 shown in FIG. 11. In an embodiment, if all ports (including AC 11, AC 12, AC 13, and EVPN Peer 11) of the first VPLS instance (that is, VPLS instance 1 in PE 1) are in an unavailable state, it means that virtual port 1 in the first VPWS instance (that is, VPWS instance 1 in PE 1) is in an unavailable state. With reference to Table 1 or Table 2, it may be considered that the main forwarding entry corresponding to MAC address 1 is in an unavailable state. In this case, the forwarding path S2 is faulty. The first network device (that is, PE 1) may forward the third packet to the fifth VPWS instance (that is, VPWS instance 1 in PE 4) in the third network device (that is, PE 4) through EVPN Peer 3 indicated by the port identifier EVPN Peer-P3 (as shown in Table 1) or the port identifier P3 (as shown in Table 2) in the first VPWS instance (that is, VPWS instance 1 in PE 1) of the first network device (that is, VPWS instance 1 in PE 1 forwards the third packet to VPWS instance 1 in PE 4 through a VPWS protection channel between VPWS instance 1 in PE 1 and VPWS instance 1 in PE 4), and finally the third packet may arrive at BRAS 1 through the forwarding path S3 shown in FIG. 11.

In the foregoing example, PE 1 and PE 4 both bear VPWS instances 1. During implementation, content actually included in the corresponding VPWS instances borne in PE 1 and PE 4 is usually different due to localized implementation, but there is a correspondence between the VPWS instances because the VPWS instances bear a same service. For ease of understanding and description, the VPWS instances are both referred to as VPWS instance 1. Similarly, content actually included in the corresponding VPLS instances borne in PE 1 and PE 4 is usually different due to localized implementation, but there is a correspondence between the VPLS instances because the VPLS instances bear a same service. For ease of understanding and description, the VPLS instances are referred to as VPLS instance 1 or VPLS instance 2.

In the foregoing technical solutions provided in the application, the first network device may determine, in the first VPWS instance based on the destination address carried in the third packet, the first virtual port corresponding to the destination address, and determine the first egress port of the third packet in the first VPLS instance indicated by the first virtual port. If the first egress port is in an available state, the first network device forwards the third packet through the first egress port; or if the first egress port is in an unavailable state, the first network device forwards the third packet through a backup port of the first egress port; or if all ports of the first VPLS instance are in an unavailable state, the first network device forwards the third packet through a backup port of the first virtual port. In this way, loss of the third packet caused because the first egress port of the third packet is unavailable can be avoided, and a packet loss rate of the network system can be reduced.

In conclusion, according to the packet transmission method provided in an embodiment of the application, the first network device is a device in the VPLS network, and the second network device is a device in the VPWS network. The first VPWS instance in the first network device and the second VPWS instance in the second network device are VPWS instances used to bear a same service, and the second network device may forward the third packet to the first VPWS instance in the first network device by using the second VPWS instance in the second network device. The first network device may forward the third packet based on the first VPLS instance that is in the first network device and that is associated with the first VPWS instance. In the technical solutions provided in the application, the first VPLS instance and the first VPWS instance in the first network device are associated, to implement interconnection between the first VPLS instance and the first VPWS instance in the first network device, so that the first network device and the second network device can perform packet forwarding according to a VPWS forwarding mechanism without learning a MAC address of a user-side device. This helps reduce pressure on the first network device and the second network device to learn the MAC address, and simplify MAC entries of the first network device and the second network device, and ensure packet forwarding performance of the network system. In addition, the first network device may dynamically select a broadband access device based on traffic of a user-side device to provide a broadband access service for the user-side device, so that resource usage of a broadband resource pool can be improved and flexibility of selecting a broadband access device for the user-side device by the first network device can be improved. Therefore, flexibility of forwarding traffic of the user-side device by the first network device is improved.

In the foregoing embodiment, before forwarding the third packet based on the first virtual port, the first network device may generate a forwarding entry in the routing and forwarding table of the first VPLS instance indicated by the first virtual port. In an embodiment, the first network device receives a fourth packet through a third port of the first VPLS instance in the first network device, and generates a forwarding entry in the routing and forwarding table of the first VPLS instance based on a source address carried in the fourth packet and the third port. A destination address in the forwarding entry is the source address carried in the fourth packet, and a port identifier in the forwarding entry is used to indicate the third port. The third port may be an AC port or an EVPN peer port in the first VPLS instance, and the AC port in the first VPLS instance may correspond to (or be bound to) at least one broadband access device. The fourth packet may be a packet sent by a broadband access device (for example, BRAS 1) to a user-side device (for example, VM 1), and the fourth packet may enter the first VPLS instance through the AC port in the first VPLS instance, or enter the first VPLS instance through the EVPN peer port in the first VPLS instance. This is not limited in an embodiment of the application.

In an embodiment, after receiving the fourth packet through the third port of the first VPLS instance in the first network device, the first network device parses the fourth packet to determine, from the fourth packet, the source address carried in the fourth packet, and generates the forwarding entry in the routing and forwarding table of the first VPLS instance based on the source address carried in the fourth packet and a port identifier of the third port. In an embodiment, the first network device and the third network device may learn an Ethernet segment (ES) route, an Ethernet segment auto discovery (ES-AD) route, and the like from each other. The first network device may determine main/backup information of the third port after the learning, and record, in the forwarding entry based on the main/backup information of the third port, main/backup identification information corresponding to the port identifier of the third port.

For example, the first VPLS instance in the first network device is VPLS instance 1 shown in FIG. 9, the source address carried in the fourth packet may be MAC address 1, and the first network device determines that the port identifier of the third port that receives the fourth packet is P11. In this case, the first network device generates the forwarding entry in the routing and forwarding table of the first VPLS instance based on the source address (that is, MAC address 1) carried in the fourth packet and the port identifier P11 of the third port. In an embodiment, the first network device may further learn an ES route, an ES-AD route, and the like from the third network device, determine main/backup information of the third port after learning, and record, in the forwarding entry based on the main/backup information of the third port, main/backup identification information "Main port" corresponding to the port identifier P11. Finally, the forwarding entry generated by the first network device is shown in the first row in Table 3.

In the foregoing embodiment, before determining, in the first VPWS instance of the first network device based on the destination address carried in the third packet, the first virtual port corresponding to the destination address, the first network device may generate a forwarding entry in the routing and forwarding table of the first VPWS instance. In an embodiment, the first network device receives a fifth packet by using the first VPLS instance in the first network device, and generates the forwarding entry in the routing and forwarding table of the first VPWS instance based on a source address carried in the fifth packet and the first VPLS instance. A destination address in the forwarding entry is the source address carried in the fifth packet, a port identifier in the forwarding entry is used to indicate the first virtual port in the first VPWS instance, and the first virtual port is used to indicate the first VPLS instance in the first network device. The routing and forwarding table of the first VPWS instance herein may be a MAC forwarding table of the first VPWS instance. The fifth packet may be a packet sent by a broadband access device (for example, BRAS 1) to a user-side device (for example, VM 1), and the fifth packet may arrive at the first VPWS instance through the first VPLS instance. This is not limited in an embodiment of the application. The following describes a process in which the first network device generates the forwarding entry in the routing and forwarding table of the first VPWS instance.

In an embodiment, the broadband access device corresponding to (or bound to) the first VPLS instance in the first network device may forward the fifth packet to the first VPLS instance in the first network device. After receiving the fifth packet by using the first VPLS instance, the first network device may parse the fifth packet to determine, from the fifth packet, the source address carried in the fifth packet, determine the first virtual port corresponding to the first VPLS instance in the first VPWS instance of the first network device, and generate the forwarding entry in the routing and forwarding table of the first VPWS instance based on the source address carried in the fifth packet and a port identifier of the first virtual port. In an embodiment, the first network device and the third network device may learn an ES route, an ES-AD route, and the like from each other. The first network device may determine main/backup information of the first virtual port after learning, and record, in the forwarding entry based on the main/backup information of the first virtual port, main/backup identification information corresponding to the port identifier of the first virtual port.

In an embodiment, the port identifier of the first virtual port may indicate only the first virtual port, or the port identifier of the first virtual port may indicate the first virtual port and a type of the first virtual port. In this case, that the first network device generates the forwarding entry in the routing and forwarding table of the first VPWS instance based on the source address carried in the fifth packet and the port identifier of the first virtual port may include: If the port identifier of the first virtual port indicates the first virtual port and the type of the first virtual port, the first network device generates the forwarding entry in the routing and forwarding table of the first VPWS instance based on the source address carried in the fifth packet and the port identifier of the first virtual port; or if the port identifier of the first virtual port indicates only the first virtual port, the first network device may further determine the type of the first virtual port, and generate the forwarding entry in the routing and forwarding table of the first VPWS instance based on the source address carried in the fifth packet, the port identifier of the first virtual port, and the type of the first virtual port.

For example, the first VPWS instance in the first network device is VPWS instance 1 in FIG. 9. The source address carried in the fifth packet may be MAC address 1, and the first virtual port corresponding to the first VPLS instance (for example, VPLS instance 1) in the first network device may be virtual port 1 in the first VPWS instance. The first network device determines that a port identifier of virtual port 1 is V-P1. Because the port identifier V-P1 indicates virtual port 1 and a type of virtual port 1, the first network device generates the forwarding entry in the routing and forwarding table of the first VPWS instance based on the source address (that is, MAC address 1) carried in the fifth packet and the port identifier V-P1 of virtual port 1. The first network device may further learn an ES route, an ES-AD route, and the like from the third network device, determine main/backup information of virtual port 1 after learning, and record, in the forwarding entry based on the main/backup information of virtual port 1, main/backup identification information "Main port" corresponding to the port identifier V-P1. Finally, the forwarding entry generated by the first network device may be shown in the first row in Table 1.

For another example, the first VPWS instance in the first network device is VPWS instance 1 in FIG. 9. The source address carried in the fifth packet may be MAC address 1, and the first virtual port corresponding to the first VPLS instance (for example, VPLS instance 1) in the first network device may be virtual port 1 in the first VPWS instance. The first network device determines that a port identifier of virtual port 1 is P1. Because the port identifier P1 indicates only virtual port 1, the first network device may determine a type of virtual port 1, and generate the forwarding entry in the routing and forwarding table of the first VPWS instance based on the source address (that is, MAC address 1) carried in the fifth packet, the port identifier P1 of virtual port 1, and the type of virtual port 1. The first network device may further learn an ES route, an ES-AD route, and the like from the third network device, determine main/backup information of virtual port 1 after learning, and record, in the forwarding entry based on the main/backup information of virtual port 1, main/backup identification information "Main port" corresponding to the port identifier P1. Finally, the forwarding entry generated by the first network device may be shown in the first row in Table 2.

In an embodiment of the application, the port identifier that is in the routing and forwarding table of the first VPWS instance and that is used to indicate the first virtual port may be identification information of the first VPLS instance indicated by the first virtual port, or other attribute information that is related to the first VPLS instance indicated by the first virtual port and that can enable the first VPWS instance to determine the first VPLS instance, for example, information about a port in the first VPLS instance. For ease of understanding, the information is referred to as a port identifier in an embodiment of the application. In an embodiment, after receiving the fifth packet by using the first VPLS instance in the first network device, the first network device generates the forwarding entry in the routing and forwarding table of the first VPWS instance based on the source address carried in the fifth packet and the identification information of the first VPLS instance (or other attribute information that enables the first VPWS instance to determine the first VPLS instance). This is not limited in an embodiment of the application.

The following describes apparatus embodiments of the application. The apparatuses in the application may be configured to perform the methods in the application. For details not disclosed in the apparatus embodiments of the application, refer to the method embodiments of the application.

Figure 12:
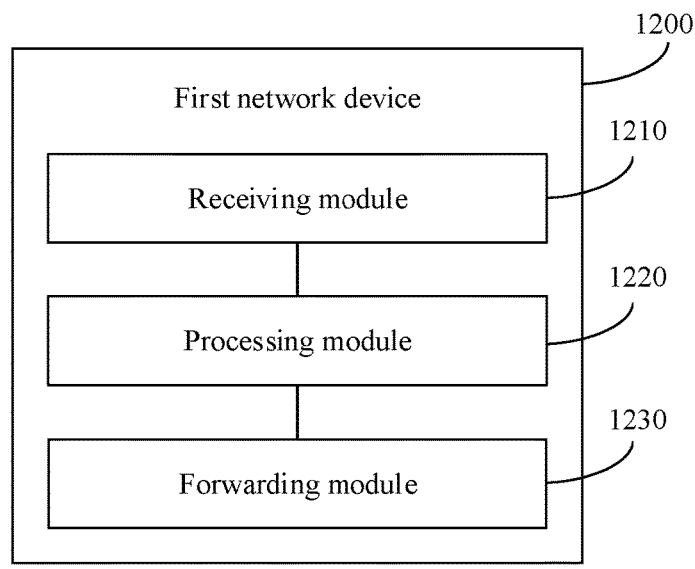
FIG. 12 is a schematic diagram of a logical structure of a first network device according to an embodiment of the application.

FIG. 12 is a schematic diagram of a logical structure of a first network device 1200 according to an embodiment of the application. The first network device 1200 is in a packet transmission system, the packet transmission system further includes a second network device, the first network device 1200 is a device in a VPLS network, and the second network device is a device in a VPWS network. Refer to FIG. 12. The first network device 1200 may include but is not limited to a receiving module 1210, a processing module 1220, and a forwarding module 1230.

The receiving module 1210 is configured to receive a first packet by using a first VPLS instance in the first network device, where the first packet is a packet to be sent to a first user-side device connected to the second network device. For function implementation of the receiving module 1210, refer to related descriptions of S401 and S701.

The processing module 1220 is configured to determine a first VPWS instance in the first network device based on an association relationship between the first VPLS instance and the first VPWS instance. For function implementation of the processing module 1220, refer to related descriptions of S402 and S702.

The forwarding module 1230 is configured to forward the first packet to a second VPWS instance in the second network device by using the first VPWS instance, where the first VPWS instance and the second VPWS instance are VPWS instances used to bear a same service. For function implementation of the forwarding module 1230, refer to related descriptions of S403 and S703.

In an embodiment, the association relationship is a binding relationship. The receiving module 1210 is configured to receive the first packet through a first port of the first VPLS instance, and the processing module 1220 is configured to determine, based on a fact that a port through which the first packet is received is the first port, the first VPWS instance that has a binding relationship with the first VPLS instance.

In an embodiment, the receiving module 1210 is further configured to: receive a second packet through a second port of a second VPLS instance in the first network device 1200. The second packet is a packet to be sent to a second user-side device connected to the second network device. For function implementation of the receiving module 1210, refer to related descriptions of S704.

The processing module 1220 is further configured to determine, based on a fact that a port through which the second packet is received is the second port, a third VPWS instance that is in the first network device 1200 and that has a binding relationship with the second VPLS instance. For function implementation of the processing module 1220, refer to related descriptions of S705.

The forwarding module 1230 is further configured to forward the second packet to a fourth VPWS instance in the second network device by using the third VPWS instance, where the third VPWS instance and the fourth VPWS instance are VPWS instances used to bear a same service. For function implementation of the forwarding module 1230, refer to related descriptions of S706.

In an embodiment, the receiving module 1210 is further configured to receive, by using the first VPWS instance in the first network device 1200, a third packet sent by the second VPWS instance in the second network device. For function implementation of the receiving module 1210, refer to related descriptions of S801.

The forwarding module 1230 is further configured to forward the third packet based on the first VPLS instance in the first network device 1200 that is associated with the first VPWS instance. For function implementation of the forwarding module 1230, refer to related descriptions of S802.

In an embodiment, the forwarding module 1230 is configured to: determine, based on a destination address carried in the third packet, a first virtual port corresponding to the destination address in the first VPWS instance, where the first virtual port is used to indicate the first VPLS instance, and forward the third packet based on the first virtual port.

In an embodiment, the destination address is a broadcast address, and the forwarding module 1230 is configured to determine, based on the destination address carried in the third packet, one or more virtual ports corresponding to the destination address in the first VPWS instance, where the one or more virtual ports include the first virtual port.

In an embodiment, the forwarding module 1230 is configured to determine a routing and forwarding table of the first VPLS instance based on the first virtual port, and forward the third packet based on the routing and forwarding table of the first VPLS instance.

In an embodiment, the forwarding module 1230 is further configured to: determine a first egress port of the third packet in the first VPLS instance based on the routing and forwarding table of the first VPLS instance and the destination address carried in the third packet; and forward the third packet through the first egress port of the third packet based on a fact that the first egress port of the third packet in the first VPLS instance is in an available state.

In an embodiment, the system further includes a third network device, and the third network device is a device in the VPLS network. The forwarding module 1230 is further configured to forward, based on a fact that the first egress port of the third packet in the first VPLS instance is in an unavailable state, the third packet to a third VPLS instance in the third network device by using the first VPLS instance, where the first VPLS instance in the first network device 1200 and the third VPLS instance in the third network device are VPLS instances used to bear a same service.

In an embodiment, the forwarding module 1230 is further configured to: determine, based on the routing and forwarding table of the first VPLS instance, that all ports of the first VPLS instance are in an unavailable state; and forward, based on the fact that all the ports of the first VPLS instance are in an unavailable state, the third packet to a fifth VPWS instance in the third network device by using the first VPWS instance in the first network device 1200, where the first VPWS instance in the first network device 1200 and the fifth VPWS instance in the third network device are VPWS instances used to bear a same service.

In an embodiment, the receiving module 1210 is further configured to: before the forwarding module 1230 forwards the third packet based on the first virtual port, receive a fourth packet through a third port of the first VPLS instance. The processing module 1220 is further configured to generate a forwarding entry in the routing and forwarding table of the first VPLS instance based on a source address carried in the fourth packet and the third port, where a destination address in the forwarding entry is the source address carried in the fourth packet, and a port identifier in the forwarding entry is used to indicate the third port.

In an embodiment, the determining, based on the destination address carried in the third packet, a first virtual port corresponding to the destination address in the first VPWS instance includes: determining the first virtual port corresponding to the destination address based on a fact that a port corresponding to the destination address in the routing and forwarding table of the first VPWS instance of the first network device 1200 is a virtual port.

In an embodiment, the determining the first virtual port corresponding to the destination address based on a fact that a port corresponding to the destination address in the routing and forwarding table of the first VPWS instance of the first network device 1200 is a virtual port includes: determining the first virtual port based on the destination address and the port identifier in the routing and forwarding table of the first VPWS instance, where the port identifier is used to indicate the first virtual port corresponding to the destination address in the first VPWS instance and a type of the first virtual port; or determine the first virtual port based on the destination address, the port identifier, and a port type in the routing and forwarding table of the first VPWS instance, where the port identifier indicates a port corresponding to the destination address in the first VPWS instance, and the port type indicates that a type of the port is a virtual port type.

In an embodiment, the receiving module 1210 is further configured to: before the forwarding module 1230 determines, based on the destination address carried in the third packet, the first virtual port corresponding to the destination address in the first VPWS instance, receive a fifth packet by using the first VPLS instance in the first network device 1200. The processing module 1220 is further configured to generate a forwarding entry in the routing and forwarding table of the first VPWS instance based on a source address carried in the fifth packet and the first VPLS instance, where a destination address in the forwarding entry is the source address carried in the fifth packet, and a port identifier in the forwarding entry is used to indicate the first virtual port.

In an embodiment, the first VPWS instance includes a port of a virtual port type.

In an embodiment, the first VPWS instance further includes a port of an EVPN Peer type.

In an embodiment, the first VPLS instance includes at least one of a port of an AC type and a port of an EVPN Peer type.

In conclusion, according to the technical solutions provided in an embodiment of the application, the first network device is a device in the VPLS network, and the second network device is a device in the VPWS network. The first VPWS instance in the first network device and the second VPWS instance in the second network device are used to bear a same service, and the first VPLS instance in the first network device is associated with the first VPWS instance in the first network device. After receiving, by using the first VPLS instance, the first packet to be sent to the first user-side device connected to the second network device, the first network device determines the first VPWS instance based on the association relationship between the first VPLS instance and the first VPWS instance, and forwards the first packet to the second VPWS instance in the second network device by using the first VPWS instance. In this way, the first network device can forward the packet destined for the first user-side device without learning a MAC address of the first user-side device. This helps reduce pressure on the first network device to learn the MAC address, simplify a MAC entry of the first network device, and ensure packet forwarding performance of the network system. In addition, after receiving the first packet, the second network device may forward the first packet according to a VPWS forwarding mechanism by using the second VPWS instance in the second network device. The second network device can forward the packet to be sent to the first user-side device without learning the MAC address of the first user-side device.

It should be understood that the PE device in an embodiment of the application may further be implemented by using an application-specific integrated circuit (ASIC) or a programmable logic device (PLD). The PLD may be a complex programmable logic device (CPLD), a field programmable gate array (FPGA), a generic array logic (GAL), or any combination thereof. Alternatively, the packet transmission method provided in the foregoing method embodiment may be implemented by using software. When the packet transmission method is implemented by using software, modules in the PE device may be software modules.

Figure 13:
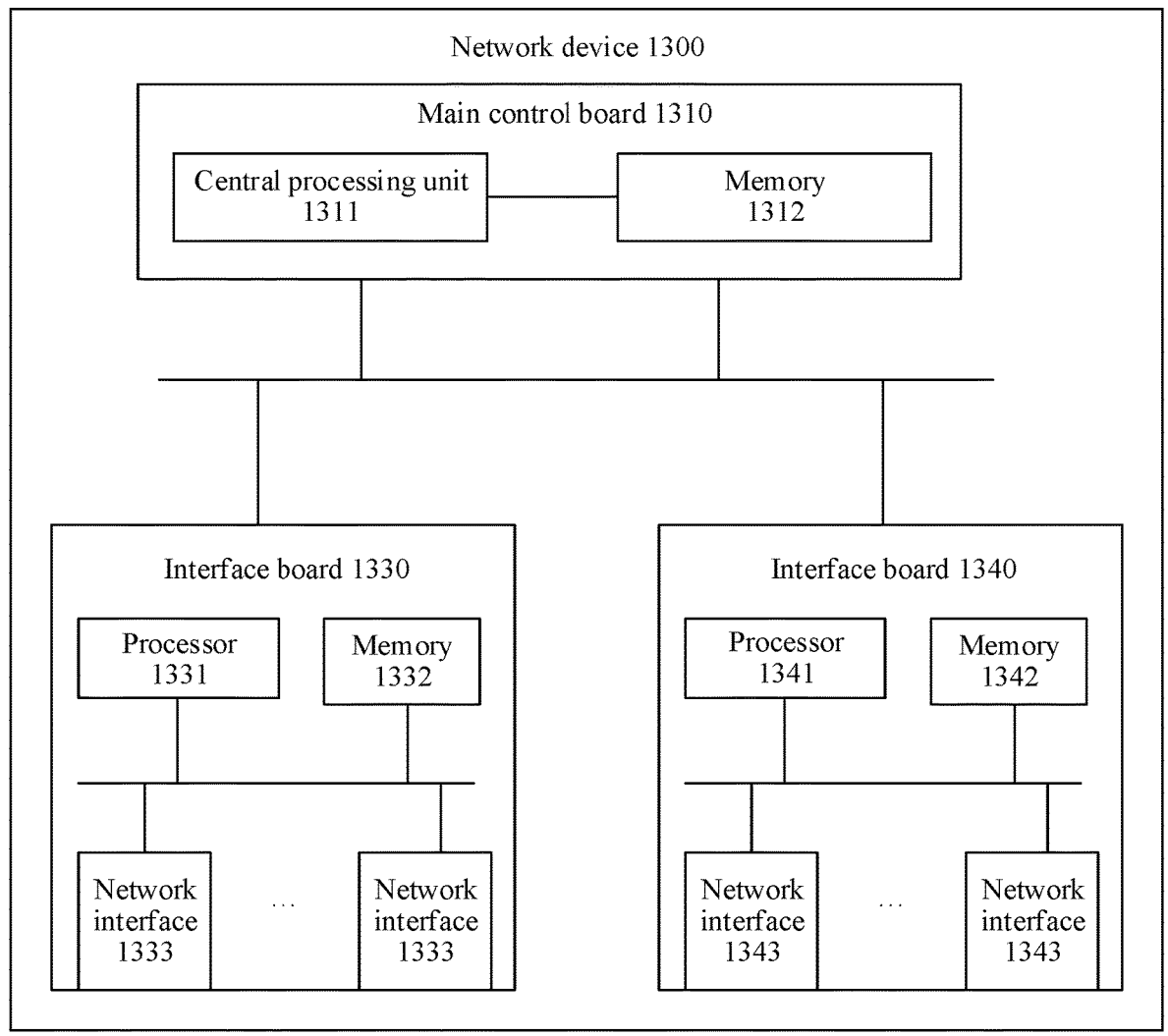
FIG. 13 is a schematic diagram of a hardware structure of a network device according to an embodiment of the application.

FIG. 13 is a schematic diagram of a hardware structure of a network device 1300 according to an embodiment of the application. The network device 1300 may be the first network device in the foregoing embodiment, and the network device 1300 may be a PE device. As shown in FIG. 13, the network device 1300 includes a main control board 1310, an interface board 1330, and an interface board 1340. When there are a plurality of interface boards, a switching board (not shown in FIG. 13) may be included. The switching board is configured to implement data exchange between interface boards (the interface board is also referred to as a line card or a service board).

The main control board 1310 is configured to complete functions such as system management, device maintenance, and protocol processing. The interface board 1330 and the interface board 1340 are configured to provide various service interfaces (for example, a POS interface, a GE interface, and an ATM interface) and forward packets. The main control board 1310 mainly includes three types of function units: a system management and control unit, a system clock unit, and a system maintenance unit. The main control board 1310, the interface board 1330, and the interface board 1340 are connected to a system backboard by using a system bus to implement interworking. The interface board 1330 includes one or more processors 1331. The processor 1331 is configured to control and manage the interface board 1330 and communicate with a central processing unit 1311 on the main control board 1310. A memory 1332 on the interface board 1330 is configured to store an association relationship between a VPWS instance and a VPLS instance, a routing and forwarding table of a VPWS instance, and/or a routing and forwarding table of a VPLS instance. The processor 1331 determines, by searching the routing and forwarding table of the VPWS instance stored in the memory 1332, a VPLS instance associated with the VPWS instance, and determines, in the VPLS instance, an egress port of a packet by searching the routing and forwarding table of the VPLS instance stored in the memory 1332. As shown in FIG. 13, the main control board 1310 may include a memory 1312. The memory 1312 on the main control board 1310 may also be configured to store a routing and forwarding table. This is not limited in an embodiment of the application.

The interface board 1330 includes one or more network interfaces 1333, configured to receive and forward a packet. The processor 1331 determines, based on a destination address carried in the packet received by the network interface 1333 and the routing and forwarding table of the VPWS instance, the VPLS instance associated with the VPWS instance. Specific implementation processes are not described herein again. Specific functions of the processor 1331 are not described herein again.

It may be understood that, as shown in FIG. 13, an embodiment includes a plurality of interface boards, and uses a distributed forwarding mechanism. In this mechanism, operations on the interface board 1340 that includes one or more processors 1341, a memory 1342 and one or more network interfaces 1343 are basically similar to operations on the interface board 1330. For brevity, details are not described again. In addition, it may be understood that the processor 1331 on the interface board 1330 and/or a processor 1341 on the interface board 1340 in FIG. 13 may be dedicated hardware or a chip, for example, a network processor or an application-specific integrated circuit, to implement the foregoing functions. This implementation is generally referred to as a manner of using dedicated hardware or a chip for processing on a forwarding plane. In another embodiment, the processor 1331 on the interface board 1330 and/or the processor 1341 on the interface board 1340 may alternatively use a general-purpose processor, for example, a general-purpose central processing unit (CPU), to implement the functions described above.

In addition, it should be noted that there may be one or more main control boards, and when there are a plurality of main control boards, the main control boards may include a primary main control board and a secondary main control board. There may be one or more interface boards. A network device having a stronger data processing capability provides more interface boards. If there are a plurality of interface boards, the plurality of interface boards can communicate with each other by using one or more switching boards, and the plurality of interface boards can jointly implement load sharing and redundancy backup. In a centralized forwarding architecture, the network device may not need the switching board, and the interface board provides a function of processing service data of an entire system. In a distributed forwarding architecture, the network device includes a plurality of interface boards. Data exchange between the plurality of interface boards may be implemented by using a switching board, and the plurality of interface boards can provide a large-capacity data exchange and processing capability. Therefore, a data access and processing capability of a network device in the distributed architecture is better than that of a device in the centralized architecture. An architecture that is to be used depends on a networking deployment scenario. This is not limited herein.

In an embodiment, the memory 1332 may be a read-only memory (ROM), another type of static storage device that can store static information and an instruction, a random access memory (RAM), or another type of dynamic storage device that can store information and an instruction, or may be an electrically erasable programmable read-only memory (EEPROM), a compact disc read-only memory (CD-ROM) or another compact disc storage, an optical disc storage (including a compact optical disc, a laser disc, an optical disc, a digital versatile disc, a Blu-ray disc, and the like), a magnetic disk or another magnetic storage device, or any other medium that can be used to carry or store expected program code in a form of an instruction or a data structure and that can be accessed by a computer. However, the memory is not limited thereto. The memory 1332 may exist independently, and is connected to the processor 1331 by using a communications bus. The memory 1332 may alternatively be integrated with the processor 1331.

The memory 1332 is configured to store program code, and the processor 1331 controls execution of the program code, to perform some or all of the operations of the packet transmission methods provided in the foregoing embodiments. The processor 1331 is configured to execute the program code stored in the memory 1332. The program code may include one or more software modules. The one or more software modules may be the functional modules provided in the embodiment in FIG. 11. The memory 1312 may also be configured to store program code, and the central processing unit 1311 controls execution of the program code, to perform some or all of the operations of the packet transmission methods provided in the foregoing embodiments.

In an embodiment, the network interface 1333 may be an apparatus that uses any transceiver, and is configured to communicate with another device or a communications network, for example, the Ethernet, a radio access network (RAN), or a wireless local area network (WLAN).

Figure 14:
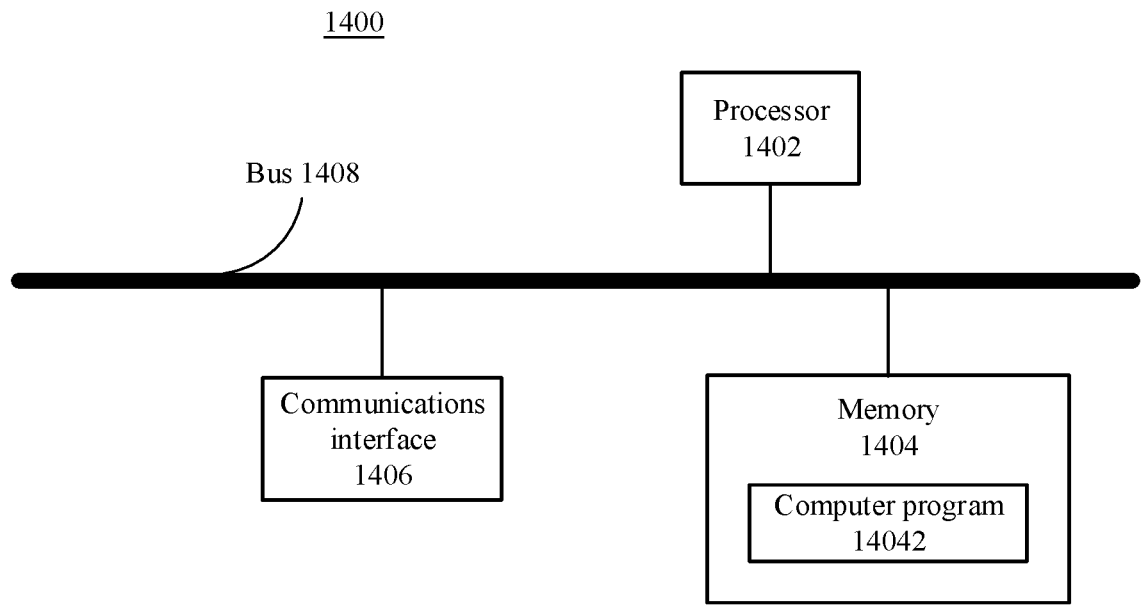
FIG. 14 is a schematic diagram of a hardware structure of a network device according to another embodiment of the application.

FIG. 14 is a schematic diagram of a hardware structure of a network device 1400 according to another embodiment of the application. The network device 1400 may be the first network device in the foregoing embodiment, and the network device 1400 may be a PE device. Refer to FIG. 14. The network device 1400 includes a processor 1402, a memory 1404, a communications interface 1406, and a bus 1408. The processor 1402, the memory 1404, and the communications interface 1406 are communicatively connected to each other by using the bus 1408. The manner of connection between the processor 1402, the memory 1404, and the communications interface 1406 shown in FIG. 14 is merely an example. In an implementation process, the processor 1402, the memory 1404, and the communications interface 1406 may be communicatively connected to each other in another connection manner other than the bus 1408.

The memory 1404 may be configured to store a computer program 14042. The computer program 14042 may include instructions and data. In an embodiment of the application, the memory 1404 may be various types of storage media, for example, a RAM, a ROM, a non-volatile RAM (RAM, NVRAM), a programmable ROM (PROM), an erasable PROM (EPROM), an electrically erasable PROM (EEPROM), a flash memory, an optical memory, a register, and the like. In addition, the memory 1404 may include a hard disk and/or a memory.

The processor 1402 may be a general-purpose processor. The general-purpose processor may be a processor that reads and executes a computer program (for example, the computer program 14042) stored in a memory (for example, the memory 1404) to perform an operation. In a process of performing the foregoing operations, the general-purpose processor may use data stored in the memory (for example, the memory 1404). The stored computer program may be executed, for example, to implement related functions of the processing module 1220. The general-purpose processor may be, for example, but not limited to, a CPU. In addition, the processor 1402 may alternatively be a dedicated processor. The dedicated processor may be a processor specially designed to perform an operation. The dedicated processor may be, for example, but not limited to, a digital signal processor (DSP), an ASIC, an FPGA, or the like. In addition, the processor 1402 may alternatively be a combination of a plurality of processors, for example, a multi-core processor. The processor 1402 may include at least one circuit, to perform all or some of the operations in the packet transmission methods provided in the foregoing embodiments.

The communications interface 1406 may include an interface that is used to implement component interconnection inside the network device 1400, for example, an input/output (I/O) interface, a physical interface, or a logical interface, and an interface that is used to implement interconnection between the network device 1400 and another device (for example, a network device or a user-side device). The physical interface may be a gigabit Ethernet (GE) interface, and may be configured to implement interconnection between the network device 1400 and another device (for example, a network device or a user-side device). The logical interface is an interface inside the network device 1400, and the logical interface may be configured to implement interconnection of components inside the network device 1400. The communications interface 1406 may be used by the network device 1400 to communicate with another network device and/or a user-side device. For example, the communications interface 1406 is used to forward and receive a packet between the network device 1400 and another network device. The communications interface 1406 may implement related functions of the receiving module 1210 and the forwarding module 1230. The communications interface 1406 may further include a transceiver to send and receive packets. The transceiver may also implement the related functions of the receiving module 1210 and the forwarding module 1230.

The bus 1408 may be any type of communications bus, for example, a system bus, used to implement interconnection between the processor 1402, the memory 1404, and the communications interface 1406.

The foregoing components may be separately disposed on chips independent of each other, or at least a part or all of the components may be disposed on a same chip. Whether all the components are separately disposed on different chips or integrated and disposed on one or more chips usually depends on a requirement for a product design. Specific implementation forms of the components are not limited in the embodiments of the application.

The network device 1400 shown in FIG. 14 is merely an example. In an implementation process, the network device 1400 may further include other components, which are not enumerated one by one in this specification. The network device 1400 shown in FIG. 14 may forward a packet by performing all or some operations of the packet transmission method provided in the foregoing embodiments.

Figure 15:
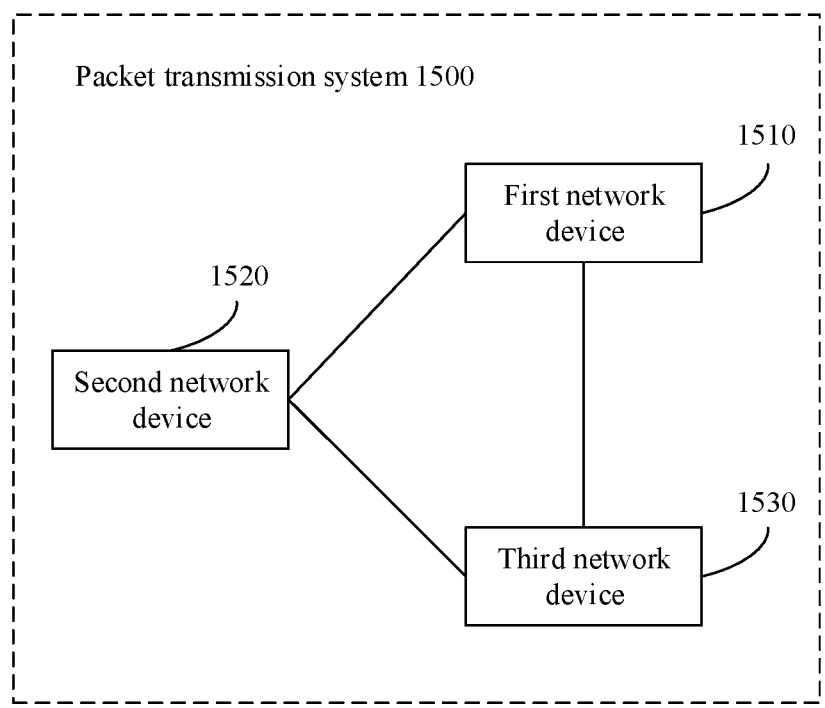
FIG. 15 is a schematic diagram of a structure of a packet transmission system according to an embodiment of the application.

FIG. 15 is a schematic diagram of a structure of a packet transmission system 1500 according to an embodiment of the application. The packet transmission system 1500 includes a first network device 1510 and a second network device 1520. The first network device 1510 is a device in a VPLS network, and the second network device 1520 is a device in a VPWS network.

The first network device 1510 is configured to: receive a first packet by using a first VPLS instance in the first network device 1510, determine a first VPWS instance in the first network device 1510 based on an association relationship between the first VPLS instance and the first VPWS instance, and forward the first packet to a second VPWS instance in the second network device 1520 by using the first VPWS instance, where the first packet is a packet to be sent to a first user-side device connected to the second network device 1520, and the first VPWS instance and the second VPWS instance are VPWS instances used to bear a same service. The second network device 1520 is configured to forward the first packet by using the second VPWS instance.

In an embodiment, the association relationship is a binding relationship. The first network device 1510 is configured to: receive the first packet through a first port of the first VPLS instance, and determine, based on a fact that a port through which the first packet is received is the first port, the first VPWS instance that has a binding relationship with the first VPLS instance.

In an embodiment, the first network device 1510 is further configured to: receive a second packet through a second port of a second VPLS instance in the first network device 1510; determine, based on a fact that a port through which the second packet is received is the second port, a third VPWS instance that is in the first network device 1510 and that has a binding relationship with the second VPLS instance; and forward the second packet to a fourth VPWS instance in the second network device 1520 by using the third VPWS instance, where the second packet is a packet to be sent to a second user-side device connected to the second network device, and the third VPWS instance and the fourth VPWS instance are VPWS instances used to bear a same service.

The second network device 1520 is further configured to forward the second packet by using the fourth VPWS instance.

In an embodiment, the second network device 1520 is further configured to send a third packet to the first VPWS instance in the first network device 1510 by using the second VPWS instance in the second network device 1520. The first network device 1510 is further configured to forward the third packet based on the first VPLS instance in the first network device 1510 that is associated with the first VPWS instance.

In an embodiment, the first network device 1510 is configured to: determine, based on a destination address carried in the third packet, a first virtual port corresponding to the destination address in the first VPWS instance, where the first virtual port is used to indicate the first VPLS instance, and forward the third packet based on the first virtual port.

In an embodiment, the destination address is a broadcast address, and the first network device 1510 is configured to determine, based on the destination address carried in the third packet, one or more virtual ports corresponding to the destination address in the first VPWS instance, where the one or more virtual ports include the first virtual port.

In an embodiment, the first network device 1510 is configured to determine a routing and forwarding table of the first VPLS instance based on the first virtual port, and forward the third packet based on the routing and forwarding table of the first VPLS instance.

In an embodiment, the first network device 1510 is configured to: determine a first egress port of the third packet in the first VPLS instance based on the routing and forwarding table of the first VPLS instance and the destination address carried in the third packet; and forward the third packet through the first egress port of the third packet based on a fact that the first egress port of the third packet in the first VPLS instance is in an available state.

Continue to refer to FIG. 15. In an embodiment, the system further includes a third network device 1530, and the third network device 1530 is a device in the VPLS network. The first network device 1510 is further configured to forward, based on a fact that the first egress port of the third packet in the first VPLS instance is in an unavailable state, the third packet to a third VPLS instance in the third network device 1530 by using the first VPLS instance, where the first VPLS instance and the third VPLS instance are VPLS instances used to bear a same service. The third network device 1530 is configured to forward the third packet by using the third VPLS instance.

In an embodiment, the first network device 1510 is further configured to: determine, based on the routing and forwarding table of the first VPLS instance, that all ports of the first VPLS instance are in an unavailable state; and forward, based on the fact that all the ports of the first VPLS instance are in an unavailable state, the third packet to a fifth VPWS instance in the third network device 1530 by using the first VPWS instance in the first network device 1510, where the first VPWS instance in the first network device 1510 and the fifth VPWS instance in the third network device 1530 are VPWS instances used to bear a same service.

The third network device 1530 is further configured to forward the third packet by using a VPLS instance in the third network device 1530 that is associated with the fifth VPWS instance.

In an embodiment, the first network device 1510 is further configured to: before forwarding the third packet based on the first virtual port, receive a fourth packet through a third port of the first VPLS instance; and generate a forwarding entry in the routing and forwarding table of the first VPLS instance based on a source address carried in the fourth packet and the third port, where a destination address in the forwarding entry is the source address carried in the fourth packet, and a port identifier in the forwarding entry is used to indicate the third port.

In an embodiment, the first network device 1510 is configured to determine the first virtual port corresponding to the destination address based on a fact that a port corresponding to the destination address in a routing and forwarding table of the first VPWS instance of the first network device 1510 is the virtual port.

In an embodiment, the first network device 1510 is configured to determine the first virtual port based on the destination address and the port identifier in the routing and forwarding table of the first VPWS instance, where the port identifier is used to indicate the first virtual port corresponding to the destination address in the first VPWS instance and a type of the first virtual port; or determine the first virtual port based on the destination address, the port identifier, and a port type in the routing and forwarding table of the first VPWS instance, where the port identifier indicates a port corresponding to the destination address in the first VPWS instance, and the port type indicates that a type of the port is a virtual port type.

In an embodiment, the first network device 1510 is further configured to: before determining, based on the destination address carried in the third packet, the first virtual port corresponding to the destination address in the first VPWS instance, receive a fifth packet by using the first VPLS instance in the first network device 1510, and generate a forwarding entry in the routing and forwarding table of the first VPWS instance based on a source address carried in the fifth packet and the first VPLS instance, where a destination address in the forwarding entry is the source address carried in the fifth packet, and a port identifier in the forwarding entry is used to indicate the first virtual port.

In an embodiment, the first VPWS instance includes a port of a virtual port type.

In an embodiment, the first VPWS instance further includes a port of an EVPN Peer type.

In an embodiment, the first VPLS instance includes at least one of a port of an AC type and a port of an EVPN Peer type.

In conclusion, according to the technical solutions provided in an embodiment of the application, the first network device is a device in the VPLS network, and the second network device is a device in the VPWS network. The first VPWS instance in the first network device and the second VPWS instance in the second network device are used to bear a same service, and the first VPLS instance in the first network device is associated with the first VPWS instance in the first network device. After receiving, by using the first VPLS instance, the first packet to be sent to the first user-side device connected to the second network device, the first network device determines the first VPWS instance based on the association relationship between the first VPLS instance and the first VPWS instance, and forwards the first packet to the second VPWS instance in the second network device by using the first VPWS instance. In this way, the first network device can forward the packet destined for the first user-side device without learning a MAC address of the first user-side device. This helps reduce pressure on the first network device to learn the MAC address, simplify a MAC entry of the first network device, and ensure packet forwarding performance of the network system. In addition, after receiving the first packet, the second network device may forward the first packet according to a VPWS forwarding mechanism by using the second VPWS instance in the second network device. The second network device can forward the packet to be sent to the first user-side device without learning the MAC address of the user-side device.

An embodiment of the application provides a computer-readable storage medium. The computer-readable storage medium stores a computer program. When the computer program is executed by a processor, all or some of the operations of the packet transmission methods provided in the foregoing method embodiments are implemented.

An embodiment of the application provides a computer program product including instructions. When the computer program product runs on a computer, the computer is enabled to perform all or some of the operations of the packet transmission methods provided in the foregoing method embodiments.

An embodiment of the application provides a chip. The chip includes a programmable logic circuit and/or program instructions. When the chip runs, the chip is configured to implement all or some of the operations of the packet transmission method provided in the foregoing method embodiments.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, some or all of the procedures or functions according to the embodiments of the application are generated. The computer may be a general-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another web site, computer, server, or data center in a wired (for example, a coaxial cable, an optical fiber, or a digital subscriber line) or wireless (for example, infrared, radio, or microwave) manner. The computer-readable storage medium may be any usable medium accessible by a computer, or a data storage apparatus, such as a server or a data center, integrating one or more usable media. The usable medium may be a magnetic medium (for example, a floppy disk, a hard disk, or a magnetic tape), an optical medium, a semiconductor medium (for example, a solid-state drive), or the like.

It should be understood that "at least one" mentioned in this specification means one or more, and "a plurality of" means two or more. "At least two" means two or more. In the application, unless otherwise specified, "/" means or. For example, A/B may represent A or B. The term "and/or" in this specification describes only an association relationship for associated objects and represents that three relationships may exist. For example, A and/or B may represent the following three cases: Only A exists, both A and B exist, and only B exists. In addition, for ease of clear description, in the application, terms such as "first", "second", and "third" are used to distinguish same items or similar items having basically the same functions. One of ordinary skill in the art may understand that the terms such as "first", "second", and "third" do not limit a quantity and an execution sequence.

Different types of embodiments such as the method embodiments and the apparatus embodiments provided in the embodiments of the application may be mutually referred to. This is not limited in the embodiments of the application. A sequence of the operations of the method embodiments provided in the embodiments of the application can be properly adjusted, and operations can be correspondingly added or deleted based on a situation. Any modified method that can be easily figured out by one of ordinary skill in the art without departing from a technical scope disclosed in the application shall fall within the protection scope of the application, and therefore details are not described again.

In the corresponding embodiments provided in the application, it should be understood that the disclosed apparatus and the like may be implemented in other composition manners. For example, the described apparatus embodiments are merely examples. For example, the unit division is merely logical function division and may be other division in actual implementation. For example, a plurality of units or components may be combined or integrated into another system, or some features may be ignored or not performed. Functions executable by the units may be implemented by using software, hardware, or a combination of software and hardware. In addition, the displayed or discussed mutual couplings or direct couplings or communication connections may be implemented through some interfaces. The indirect couplings or communication connections between the apparatuses or units may be implemented in an electrical form or another form.

The units described as separate parts may or may not be physically separate, and parts displayed as units may or may not be physical units, may be located at one position, or may be distributed on a plurality of network devices (for example, terminal devices). Some or all of the units may be selected based on an actual requirement to achieve an objective of a solution of the embodiments.

The foregoing descriptions are merely embodiments of the application, but are not intended to limit the protection scope of the application. Any equivalent modification or replacement readily figured out by one of ordinary skill in the art within the technical scope disclosed in the application shall fall within the protection scope of the application. Therefore, the protection scope of the application shall be subject to the protection scope of the claims.

What is claimed is:

1. A packet transmission method, wherein the method is applied to a system comprising a first network device and a second network device, the first network device is in a virtual private LAN service (VPLS) network, the second network device is in a virtual private wire service LVPWS network, the method comprising:
   receiving, at the first network device, a first packet through a first port of a first VPLS instance executing on the first network device, wherein the first packet is to be sent to a first user-side device connected to the second network device;
   determining, by the first network device, a first VPWS instance executing on the first network device that has an association relationship with the first port of the first VPLS instance; and
   forwarding, by the first network device using the first VPWS instance, the first packet to a second VPWS instance executing on the second network device, wherein the second network device is in the VPWS network, and wherein the first VPWS instance and the second VPWS instance bear a same service.

2. The method according to claim 1, wherein the association relationship is a binding relationship.

3. The method according to claim 2, further comprising:
receiving, by the first network device, a second packet through a second port of a second VPLS instance executing on the first network device, wherein the second packet is to be sent to a second user-side device connected to the second network device;
determining, by the first network device, a third VPWS instance executing on the first network device that has a binding relationship with the second port of the second VPLS instance; and
forwarding, by the first network device, the second packet to a fourth VPWS instance executing on the second network device by using the third VPWS instance, wherein the third VPWS instance and the fourth VPWS instance bear a same service.

4. The method according to claim 1 further comprising:
receiving, by the first network device using the first VPWS instance, a third packet sent by the second VPWS instance in the second network device; and
forwarding, by the first network device, the third packet based on the first VPLS instance that is associated with the first VPWS instance.

5. The method according to claim 4, wherein the forwarding, by the first network device, the third packet based on the first VPLS instance in the first network device that is associated with the first VPWS instance comprises:
determining, by the first network device based on a destination address carried in the third packet, a first virtual port corresponding to the destination address in the first VPWS instance, wherein the first virtual port is used to indicate the first VPLS instance; and
forwarding, by the first network device, the third packet based on the first virtual port.

6. The method according to claim 5, wherein the destination address is a broadcast address, and the determining, by the first network device based on the destination address carried in the third packet, the first virtual port corresponding to the destination address in the first VPWS instance comprises:
determining, by the first network device based on the destination address carried in the third packet, one or more virtual ports corresponding to the destination address in the first VPWS instance, wherein the one or more virtual ports comprise the first virtual port.

7. The method according to claim 5, wherein the forwarding, by the first network device, the third packet based on the first virtual port comprises:
determining, by the first network device, a routing and forwarding table of the first VPLS instance based on the first virtual port; and
forwarding, by the first network device, the third packet based on the routing and forwarding table of the first VPLS instance.

8. The method according to claim 7, wherein the forwarding, by the first network device, the third packet based on the routing and forwarding table of the first VPLS instance comprises:
determining, by the first network device, a first egress port of the third packet in the first VPLS instance based on the routing and forwarding table of the first VPLS instance and the destination address carried in the third packet; and
forwarding, by the first network device, the third packet through the first egress port of the third packet based on a fact that the first egress port of the third packet in the first VPLS instance is in an available state.

9. The method according to claim 8, wherein the system comprises a third network device, and the third network device is in the VPLS network; and the forwarding, by the first network device, the third packet based on the routing and forwarding table of the first VPLS instance comprises:
forwarding, by the first network device based on the first egress port of the third packet in the first VPLS instance is in an unavailable state, the third packet to a third VPLS instance in the third network device by using the first VPLS instance, wherein the first VPLS instance and the third VPLS instance are VPLS instances used to bear a same service.

10. The method according to claim 9, wherein the forwarding, by the first network device, the third packet based on the routing and forwarding table of the first VPLS instance comprises:
determining, by the first network device based on the routing and forwarding table of the first VPLS instance, that all ports of the first VPLS instance are in the unavailable state; and
forwarding, by the first network device based on the fact that all the ports of the first VPLS instance are in the unavailable state, the third packet to a fifth VPWS instance in the third network device by using the first VPWS instance, wherein the first VPWS instance and the fifth VPWS instance are VPWS instances used to bear a same service.

11. A packet transmission system, comprising:
a first network device;
a second network device, wherein the first network device is in a virtual private LAN service (VPLS) network, and the second network device is in a virtual private wire service (VPWS) network;
the first network device is configured to:
receive a first packet through a first port of a first VPLS instance executing on the first network device;
determine a first VPWS instance executing on the first network device that has an association relationship with the first port of the first VPLS instance; and
forward, using the first VPWS instance, the first packet to a second VPWS instance executing on the second network device, wherein the second network device is in the VPWS network, and wherein the first packet is to be sent to a first user-side device connected to the second network device, and the first VPWS instance and the second VPWS instance bear a same service; and
the second network device is configured to forward the first packet by using the second VPWS instance.

12. The system according to claim 11, wherein the association relationship is a binding relationship.

13. The system according to claim 12, wherein the first network device is further configured to:
receive a second packet through a second port of a second VPLS instance executing on the first network device;
determine, a third VPWS instance executing on the first network device that has a binding relationship with the second port of the second VPLS instance; and
forward the second packet to a fourth VPWS instance executing on the second network device using the third VPWS instance, wherein the second packet is to be sent to a second user-side device connected to the second network device, and the third VPWS instance and the fourth VPWS instance bear a same service; and the second network device is further configured to forward the second packet by using the fourth VPWS instance.

14. The system according to claim 13, wherein:
the second network device is further configured to send a third packet to the first VPWS instance in the first network device using the second VPWS instance; and
the first network device is further configured to forward the third packet based on the first VPLS instance that is associated with the first VPWS instance.

15. The system according to claim 14, wherein the first network device is configured to: determine, based on a destination address carried in the third packet, a first virtual port corresponding to the destination address in the first VPWS instance, wherein the first virtual port is used to indicate the first VPLS instance; and forward the third packet based on the first virtual port.

16. The system according to claim 15, wherein the destination address is a broadcast address, and the first network device is configured to determine, based on the destination address carried in the third packet, one or more virtual ports corresponding to the destination address in the first VPWS instance, wherein the one or more virtual ports comprise the first virtual port.

17. A first network device comprising:
a memory and a processor, wherein the memory is configured to store a computer program; and
the processor is configured to execute the computer program stored in the memory that cause the first network device to:
receive a first packet through a first port of a first virtual private LAN service (VPLS) instance executing on the first network device, wherein the first packet is to be sent to a first user-side device connected to a second network device;
determine a first virtual private wire service (VPWS) instance executing on the first network device that has an association relationship with the first port of the first VPLS instance; and
forward, using the first VPWS instance, the first packet to a second VPWS instance executing on the second network device, wherein the second network device is in the VPWS network, and wherein the first VPWS instance and the second VPWS instance bear a same service.

18. The first network device according to claim 17, wherein the association relationship is a binding relationship.

19. The first network device according to claim 18, wherein the computer program, when executed by the processor, cause the first network device to:
receive a second packet through a second port of a second VPLS instance executing on the first network device, wherein the second packet is to be sent to a second user-side device connected to the second network device;
determine, a third VPWS instance executing on the first network device that has a binding relationship with the second port of the second VPLS instance; and
forward the second packet to a fourth VPWS instance executing on second network device using the third VPWS instance, wherein the third VPWS instance and the fourth VPWS instance bear a same service.

20. A non-transitory computer-readable storage medium, storing a computer program that when is executed by a processor, causes the processor to perform a packet transmission method comprising:
receiving a first packet through a first port of a first virtual private LAN service (VPLS) instance executing on a first network device, wherein the first packet is to be sent to a first user-side device connected to a second network device;
determining a first virtual private wire service (VPWS) instance executing on the first network device that has an association relationship with the first port of the first VPLS instance; and
forwarding, using the first VPWS instance, the first packet to a second VPWS instance executing on the second network device, wherein the second network device is in the VPWS network, and wherein the first VPWS instance and the second VPWS instance bear a same service.

* * * * *

UNITED STATES PATENT AND TRADEMARK OFFICE
CERTIFICATE OF CORRECTION

PATENT NO. : 11,695,693 B2
APPLICATION NO. : 17/552704
DATED : July 4, 2023
INVENTOR(S) : Haibo Wang et al.

It is certified that error appears in the above-identified patent and that said Letters Patent is hereby corrected as shown below:

In the Claims

In Claim 1, Column 54, Line 51, delete "LVPWS" and insert --(VPWS)--.

Signed and Sealed this
Tenth Day of October, 2023

Katherine Kelly Vidal
*Director of the United States Patent and Trademark Office*